(12) United States Patent
Sasaki et al.

(10) Patent No.: US 12,254,379 B2
(45) Date of Patent: Mar. 18, 2025

(54) INFORMATION READER

(71) Applicant: DENSO WAVE INCORPORATED, Chita-gun (JP)

(72) Inventors: Kentaro Sasaki, Chita-gun (JP); Koji Konosu, Chita-gun (JP); Yuichi Ito, Chita-gun (JP); Yosuke Kanbe, Chita-gun (JP); Takeshi Fujisumi, Chita-gun (JP); Yoshihiro Yamazaki, Chita-gun (JP); Ryohei Kagami, Chita-gun (JP)

(73) Assignee: DENSO WAVE INCORPORATED, Aichi-Pref. (JP)

( * ) Notice: Subject to any disclaimer, the term of this patent is extended or adjusted under 35 U.S.C. 154(b) by 0 days.

(21) Appl. No.: 18/284,977

(22) PCT Filed: Mar. 31, 2022

(86) PCT No.: PCT/JP2022/016728
§ 371 (c)(1),
(2) Date: Sep. 29, 2023

(87) PCT Pub. No.: WO2022/211064
PCT Pub. Date: Oct. 6, 2022

(65) Prior Publication Data
US 2024/0176970 A1 May 30, 2024

(30) Foreign Application Priority Data

Mar. 31, 2021 (JP) .................................. 2021-061763
Jan. 27, 2022 (JP) .................................. 2022-010885

(51) Int. Cl.
*G06K 7/14* (2006.01)
*G06K 7/10* (2006.01)

(52) U.S. Cl.
CPC ......... *G06K 7/1465* (2013.01); *G06K 7/1417* (2013.01); *G06K 2007/10524* (2013.01)

(58) Field of Classification Search
CPC .............. G06K 7/1465; G06K 7/1417; G06K 2007/10524
See application file for complete search history.

(56) References Cited

U.S. PATENT DOCUMENTS

2021/0397916 A1  12/2021  Satish et al.

FOREIGN PATENT DOCUMENTS

| JP | 2018-045735 A | 3/2018 | |
| JP | 2020-098108 A | 6/2020 | |
| WO | WO-2020081435 A1 * | 4/2020 | ........... G06K 19/027 |

\* cited by examiner

*Primary Examiner* — Jamara A Franklin
(74) *Attorney, Agent, or Firm* — Oliff PLC

(57) ABSTRACT

In an information reader, a first relationship information, which defines the two-dimensional area of a first information code (e.g., the position coordinates of the four corner points), is detected from a first information code image. The first information code is subjected to reading information, based on the detected first relationship information. Parameters of a learning model are then adjusted based on training data including multiple successful cases of a reading process using the first relationship information. A second information code image captured by a camera is inputted to the learning model. A second relationship information, which is an estimated value of the information that defines the two-dimensional region of the second information code, is obtained from the learning model. The information recorded in the second information code is read based on the acquired second relationship information, thus reading results being outputted.

19 Claims, 22 Drawing Sheets

(FIRST AND FIFTH TO SEVENTH EMBODIMENTS)

FIG.5
(FIRST, SECOND, FIFTH AND SEVENTH EMBODIMENTS)
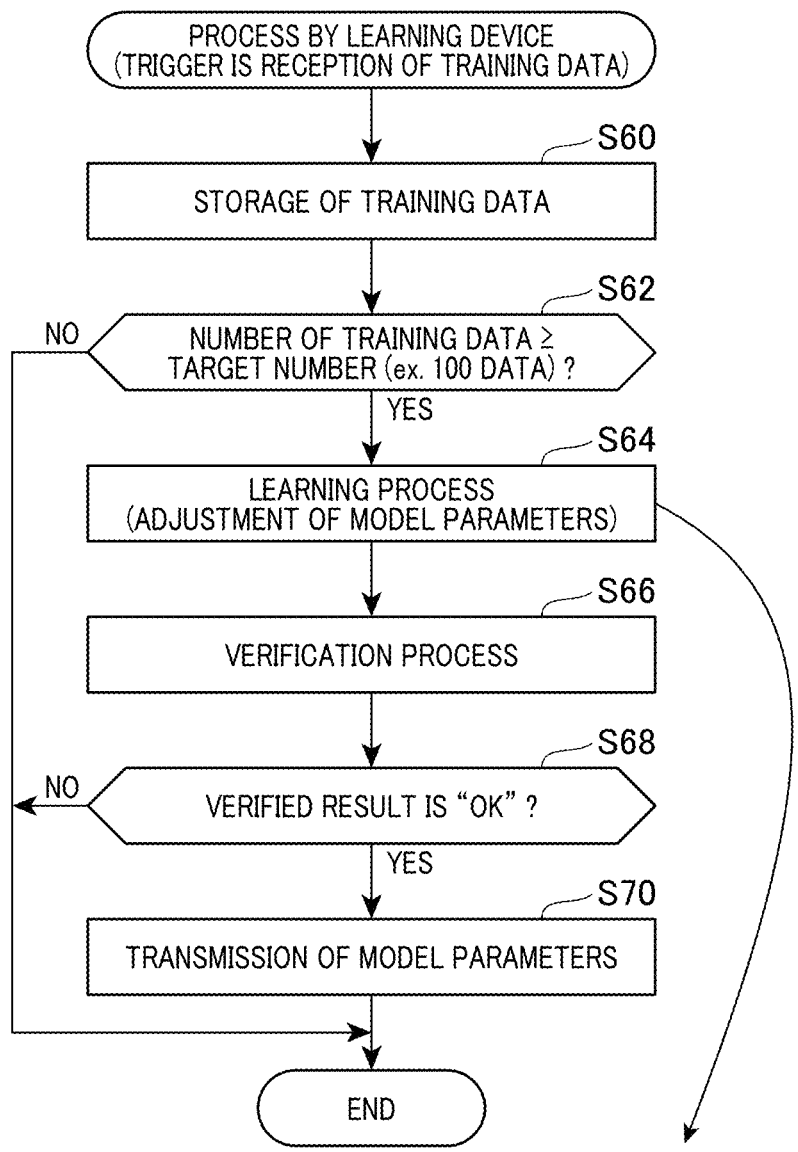
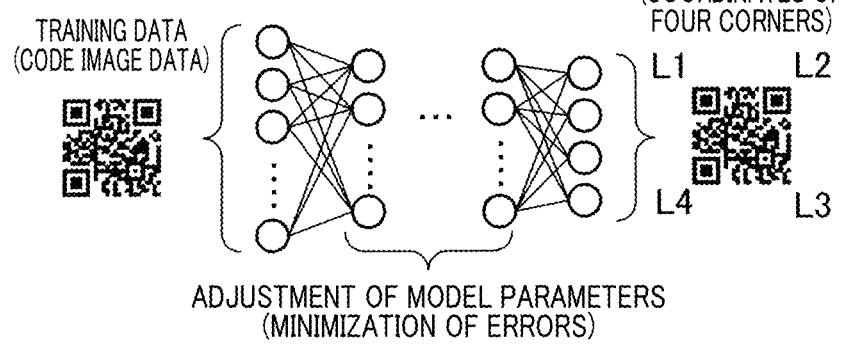

(FIRST TO FOURTH, SIXTH AND SEVENTH EMBODIMENTS)

FIG.7 (SECOND EMBODIMENT)

(SIXTH EMBODIMENT)

(OTHER CLASSIFIED CASES OF DETERIORATED PATTERNS)

(OTHER CLASSIFIED CASES OF DETERIORATED PATTERNS)

FIG.18
(OTHER CLASSIFIED CASES OF DETERIORATED PATTERNS)
PITCH SHIFT CASE
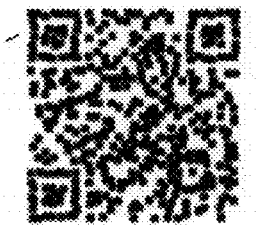
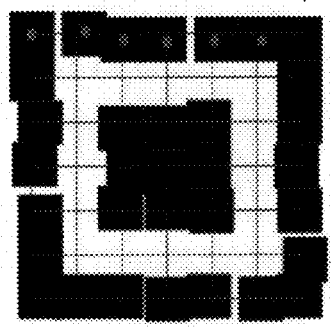
| PITCH SHIFT RATIO | DATA GROUP | UPPER VALUE 60 |
|---|---|---|
| BELOW 5% | TD1、TD2 | 10 |
| BELOW 10% | TD3 | 10 |
| BELOW 15% | — | 10 |
| 15% OR MORE | — | 10 |

(TENTH AND ELEVENTH EMBODIMENTS)

FIG.21 (TWELFTH EMBODIMENT)

(PRACTICAL EXAMPLE 1 OF CLIPPING PROCESS)

(PRACTICAL EXAMPLE 2 OF CLIPPING PROCESS)

(PRACTICAL EXAMPLE 2 OF CLIPPING PROCESS)

INFORMATION READER

CROSS-REFERENCE TO RELATED APPLICATION

This application is based on and claims the benefit of priority from earlier Japanese Patent Applications No. 2021-061763 filed on Mar. 31, 2021; and No. 2022-010885 filed on Jan. 27, 2022 the descriptions of which are incorporated herein by reference.

BACKGROUND

Technical Field

The technology disclosed in the present disclosure relates to technology for reading information recorded in two-dimensional information codes.

Related Art

Patent document 1 discloses a reader system that reads information in a two-dimensional code by adjusting the reading conditions (brightness, exposure time, and presence of a filter) for reading the two-dimensional code. This reader system reads information in the two-dimensional code according to reading conditions indicated by an expansion bank, instead of the reading conditions indicated by a reference bank when the reading of the information in the two-dimensional code fails due to deterioration of the density of the two-dimensional code, influence of outside light, etc. The expansion bank is generated by adjusting the reference bank according to predetermined adjustment rules.

CITATION LIST

Patent Literature

Patent Literature 1

JP-A-2018-045735

The foregoing technique only adjusts the reading conditions. Thus, for example, even if the reading conditions are adjusted, if the information for reading information in a 2D code (e.g., information indicating the position of the 2D code) cannot be detected from a 2D code image, the information in the 2D code cannot be read.

SUMMARY

Thus it is desired to provide techniques for dealing with situations where the information in a two-dimensional code cannot be read.

An information reader disclosed in the present specification, including:
  a camera imaging a two-dimensional information code;
  a first code process execution unit configured to perform a first code process, the first code process includes
    a detection process detecting a first relationship information defining a two-dimensional code area of the first information code from an image of a first information code which serves as the information code imaged by the camera;
    a reading process reading information recorded in the first information code based on the first relationship information which has been detected;
  an adjustment unit configured to adjust learning model parameters based on training data including, at least, a plurality of successful cases of the reading process read based on the first relationship information, the learning model parameters being for outputting second relationship information shown by estimated values of information defining a two-dimensional code area of the information code from the information code imaged by the camera; and
  a second code process execution unit configured to execute a second code process, the second code process includes
    an acquisition process acquiring inputting, into the learning model, an image of the second information code, which serves as the information code imaged by the camera, and acquire the second relationship information from the learning model;
    a reading process reading information recorded in the second information code based on the second relationship information which has been acquired; and
    an output process outputting a reading result of the reading process.

According to such a configuration, the information reader uses training data including at least a plurality of successful cases of the reading process using the first relationship information detected by the detection process. With this use, the information reader adjusts the parameters of a learning model that outputs relational information about the information code from the image of the information code.

After adjusting the parameters, the information reader executes an acquisition process using the learning model to obtain second relationship information from the second information code, and then executes a reading process using the acquired second relationship information.

For example, in a situation where the detection process fails even after adjusting the reading conditions of the reading process, the acquisition process using the learning model can obtain second relationship information from the second information code. Hence, it is possible to deal with situations where the information in the two-dimensional code cannot be read due to the failure of the detection process even after adjusting the reading conditions in the reading process.

The first relationship information may be information indicating the position coordinates of the four corner points (positions) of the information code.

According to this configuration, the position coordinates of the points (positions) at the four corners of the information code can be obtained by referring to the learning model (i.e., based on the learning model).

The first relationship information may be information indicating the black-and-white patterns of a plurality of cells constituting the two-dimensional code region of the information code.

According to this configuration, the black-and-white patterns of the plurality of cells of the information code can be acquired by referring to the learning model (i.e., based on the learning model).

In the first relationship information, for each of the plurality of cells, information indicating the location of the cell and a value indicating whether the color of those cells is white or black may be associated with the cell.

For example, it assumed a comparative example in which data indicating the black and white pattern of the plurality of cells (hereinafter referred to as "pattern data") is a plurality of cells indicating an information code. In this comparative example, the information content of the pattern information increases with an increase in the number of pixels.

In contrast, according to the foregoing configuration in the present disclosure, one value is mapped to one cell, so that if the number of information code cells is constant, the information content of the pattern data does not increase with an increase in the number of pixels. Hence, compared to the above comparative example, the increase in the information volume of pattern data can be suppressed.

The information reader may be provided with one or more code reading devices equipped with the camera, the first code process execution unit, and the second code process execution unit, and a learning device which is separate from the one or more code readers but equipped with the adjustment unit. In the present embodiment, the one or more code readers may obtain the adjusted parameters from the learning device, and the second code process execution unit may execute the second code process with reference to (i.e., based on) the obtained and adjusted parameters.

To compare with the above configuration, for example, it is assumed that a comparative example is provided in which a single information reader itself is equipped with the camera, the first code process execution unit, the second code process execution unit, and the adjustment unit. In this comparative example, the single information reader not only reads the information code, but also performs the adjustment of the parameters of the learning model. In this case, it may be necessary to increase the processing capability of the single information reader, compared to conventional configurations that did not perform adjustments to the parameters of a learning model. In contrast, according to the foregoing configuration provided in the present disclosure, the adjustment of the parameters of the learning model is performed by a learning device that is separate from the code reader. Thus, adjustments to the parameters of the learning model can be performed even without increasing the processing capability of the code reader compared to that of conventional readers.

The learning device may be built on an Internet, in which the information reader further comprises an intermediate device connected to the Internet and configured to intermediate communication between the one or more code readers and the learning device.

This configuration prevents the code reader from receiving access directly from the Internet.

An output device may be provided and configured to output a specific information code in which the adjusted parameters are recorded,
  wherein each of the one or more code readers is configured to read the adjusted parameters from the specific information code outputted by the output device, thereby obtaining from the learning device all or part of the adjusted parameters.

According to this configuration, the code reader can obtain parameters by reading the specific information code.

The one or more code readers may include a first code reader and a second code reader which is different from the first code reader, the learning device may be configured to acquire the training data from the first code reader and adjust the parameters based on the acquired training data, and the second code reader may be configured to acquire from the leaning device the parameters which have been adjusted based on the training data in the first code reader, and execute the second code process based on the acquired parameters.

According to this configuration, the second code reader can use successful cases acquired in the first code reader, which is different from the second code reader.

The information reader may further include a specific memory, wherein the specific memory includes a first area and a second area which is different from the first area, the first area stores therein programs for executing the first and second code processes, the second area is for storing therein a plurality of pieces of learning information, and each of the plurality of pieces of learning information includes the learning model and the adjusted parameters.

According to this configuration, multiple pieces of learning information can be stored for various situations in which information codes are read. It is possible to respond to the various situations.

The information reader may include a specific memory, wherein the adjustment unit may be configured to start adjusting the parameters of the learning model after the plurality of successful cases contained in the training data exceeds in number a predetermined number.

The information reader further may incudes a classification unit configured to classify a target information code which is successfully read in the reading process of the first code process, into a specific pattern of a plurality of patterns relating to types of deterioration of the information code, and a determination unit configured to determine whether to adopt a successful case of the target information code as the training data, based on the classified specific pattern.

To ensure the reliability of the parameters of the learning model, the number of successful cases must exceed a predetermined number. However, unconditional adoption of successful cases as training data may cause inconvenience. In other words, when the number of successful cases as training data exceeds a predetermined number, the variation of successful cases in the training data may be biased toward cases with only a particular pattern of degradation (e.g., a particular stain at a particular location).

In this regard, according to the foregoing configuration, the information reader classifies the successful cases of the target information code based on the degradation patterns of the information code. Therefore, in the information reader, based on the results of this classification, it is determined whether or not the successful cases of the target information code should be adopted as the training data.

This determination prevents the successful cases in the training data from being biased toward cases with only a specific pattern of deterioration or degradation.

The term "deterioration" in this specification includes not only age-related deterioration of the information code, but also deterioration of the printing device that prints the information code and deformation of the information code caused by unstable support during printing of the media on which the information code is printed.

The classification unit may be configured to specify a deteriorated location of the target information by comparing an image of a restored code restored by an error correction applied to the target information code in the reading process, with a binarized image obtained from an actual image of the target information code, and classify the target information code into the specific pattern, based on the deteriorated location obtained by the comparison.

According to this configuration, target information codes can be classified based on deteriorated locations in the actual images of the target information codes.

By way of example, the classification unit may be configured to classify the target information code into the specific pattern, based on at least one of a contrast of an image of the target information code and deformation of the target information code.

According to this configuration, the target information codes can be classified based on at least one of: contrast in the actual images of the target information codes and actual deformations of the target information codes.

Furthermore, the information reader may include a classification unit configured to classify a target information code successfully read by the reading process of the first code process, into a specific item among a plurality of items presenting internal factors of the information reader, and a determination unit configured to determine whether to adopt a successfully read case of the target information code as the training data, based on the classified specific items. In this configuration, the plurality of items include at least one of: two or more items related to image processing performed on the image of the information code by the information reader, two or more items relating to imaging conditions under which the information reader captures the information code, and two or more items relating to a processing time for the information reader to read information recorded in the information code.

This configuration can suppress successful cases in the training data from being biased toward cases in patterns corresponding to specific internal factors.

Moreover, the adjustment unit may be configured to start adjusting the parameters of the learning model when two or more successful cases among the plurality of successful cases exceeds, in number, specific number that is less than the predetermined number, even before the plurality of successful cases contained in the training data exceeds, in number, the predetermined number. In this configuration, each of the two or more successful cases is a case indicating an increased likelihood that the information code will fail to be read although the information code can currently be read successfully.

According to this configuration, the learning can be started promptly without waiting for the number of successful cases to reach a predetermined number in a situation where the possibility of information code reading failure is increasing.

By way of example, the information reader further includes a first memory; and a first storage control unit configured to store the successful cases of the target information code in the first memory as the training data when it is determined that the successful cases of the target information code is adopted as the training data based on the classified specific pattern, and not to store the successful cases of the target information code in the specific memory when it is determined that the successful cases of the target information code is not adopted as the training data based on the classified specific pattern. In this configuration, the adjustment unit is configured to adjust the parameters depending on the training data stored in the first memory.

According to this configuration, the amount of first memory used to store the training data can be reduced.

Moreover, the information reader may further include an increase control unit configured to apply an image processing to a code image which is an image of the information code imaged by the camera, generate virtual cases of the reading process, and increase the number of successful cases in the training data. In this configuration, the image processing may include at least one of a process for increasing a contrast of the code image, a process for adding a predetermined image to the code image, and a process for processing respective cells of the information code presented by the code image.

To ensure the reliability of the parameters of the learning model, more than a given number of successful cases are required. According to the above configuration, the number of successful cases can be increased in situations where the number of successful cases does not exceed the given number. Even if the actual number of successful cases does not exceed the given number, the reliability of the parameters of the learning model can be ensured.

The information may further include a second memory storing therein, for each of a plurality of information codes, case information indicating examples of the reading process performed on the information codes. In this configuration, the increase control unit is configured to select one or more image processing types from among the plurality of image processing types based on trends in the examples of the reading process indicated by the plurality of said case information stored in the second memory, and execute the one or more image processing types that have been selected.

For example, a comparative example is assumed in which a virtual case study is generated through image processing that is predetermined by the administrator or others. In this comparative example, the predetermined image processing may correspond to different examples from the actual reading process examples. According to the above configuration, the virtual examples can be generated with appropriate image processing that takes into account the trends of the actual reading process examples.

The information reader may further include a second storage control unit configured to store, into the second memory, information indicating examples of the reading process performed on the first information code when the reading process using the first relationship information is performed.

According to this configuration, case information for generating virtual cases can be stored and accumulated each time the reading process is executed.

Incidentally, the second code process may include a clipping process that crops the image of the second information code from the image captured by the camera with reference to the position of an indicator marker projected to the second information code.

According to this configuration, a code image including the two-dimensional code can be simply cut out from the captured image based on the existing instruction markers.

Also, there can be provided a control method according to the foregoing information reader, a computer program according to the foregoing information reader, and a storage medium in which computer programs of such a device and method are stored in advance in a computer-readable manner.

BRIEF DESCRIPTION OF THE DRAWINGS

In the accompanying drawings:

FIG. 5 is a flowchart explaining a process executed by a learning device;

FIG. 18 is an illustration explaining classification a pitch-shift phenomena of cells;

DETAILED DESCRIPTIONS OF PREFERRED EMBODIMENTS

Figure 1:
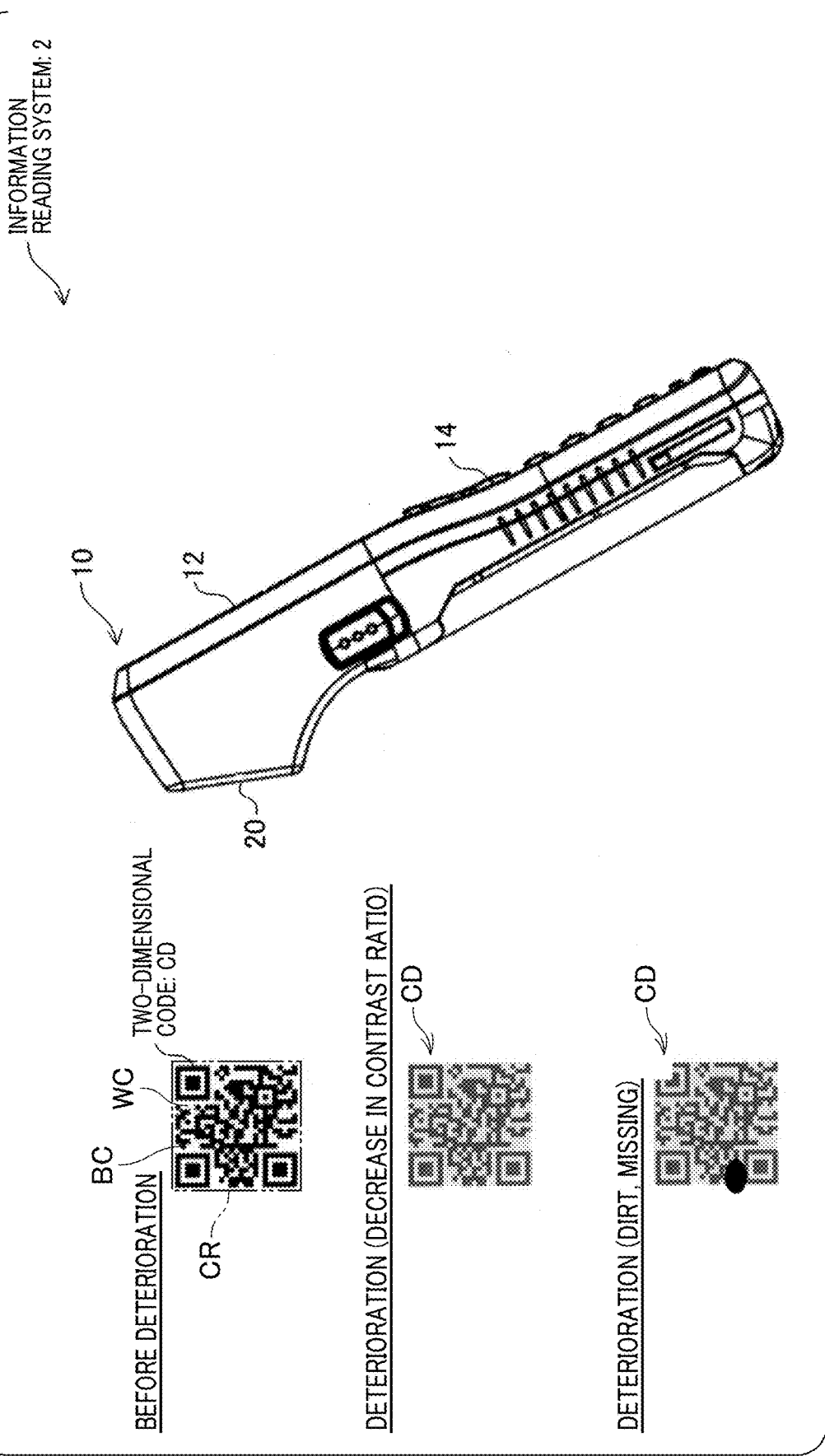
FIG. 1 is a view outlining an information reading system according to embodiments disclosed in the disclosure.
Figure 2:
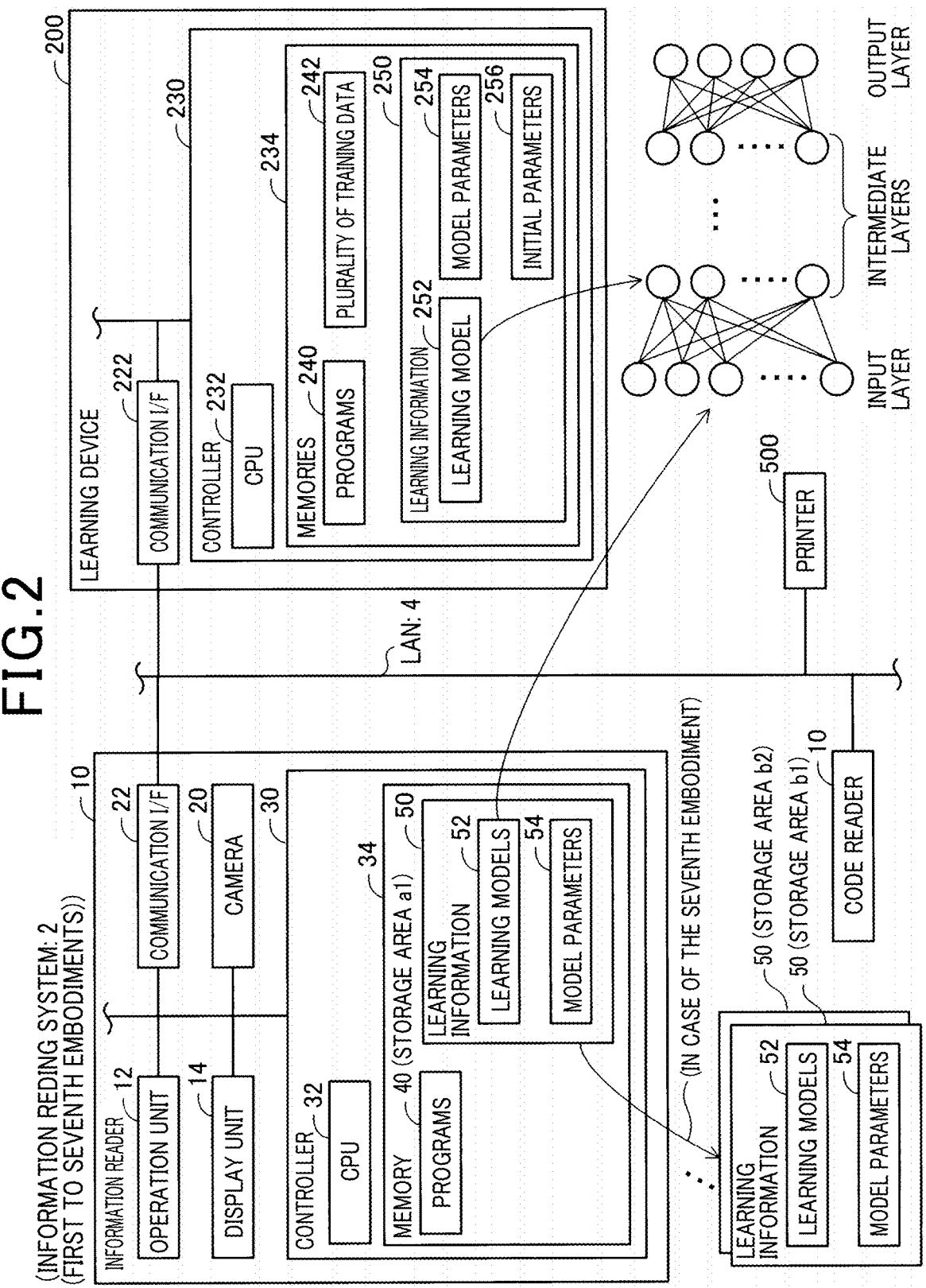
FIG. 2 is a block diagram showing the information reading system.

First Embodiment (Information Reading System: FIGS. 1 and 2)

An information reading system 2 according to the present embodiment is provided as a system for reading information recorded therein from a two-dimensional code CD that has a two-dimensional code area CR and records information in this code area CR. For example, the two-dimensional code CD can be formed and displayed on a designated medium (e.g., metal, substrate, resin, paper medium, etc.), and used in various locations such as a factory, outdoor workshop, etc. As illustrated in FIG. 1, for example, the code area CR is a rectangle (square or rectangle), with black cells (dark cells) BC and white cells (light cells) WC mapped according to specific rules and encoded information (information to be displayed).

In addition, the two-dimensional code CR may be used for a long period of time. Hence, the two-dimensional code CR may deteriorate or degrade over time. For example, black portions of the two-dimensional code CR (composed of black cells (dark cells) BR) become lighter in part or entirely, and the contrast of the black portions against white portions (composed of white cells (light cells) WR) of the two-dimensional code CR decreases over time. In addition, as the time passes, a portion of the two-dimensional code CR may be lost or contaminated with dirt.

As shown in FIG. 2, the information reading system 2 is equipped with two code readers 10, a learning device 200, and a printer 500. Each of such devices 10, 200, and 500 are communicably connected to LAN 4 and can communicate via LAN 4 to each other. LAN 4 may be a wired LAN or a wireless LAN. The information reading system 2 is equipped with the code readers 10, but this is only one example. For example, the information reading system 2 may be equipped with only a single code reading device 10 or three or more code reading devices 10.

(Configuration of the Code Reader 10: FIGS. 1 and 2)

The code reader 10 is a portable device for reading the information recorded in the two-dimensional code CR. The appearance of the code reader 10 shown in FIG. 1 is only one example; for example, the code reader 10 may have the same appearance as a smartphone.

The code reader 10 is equipped with an operation unit 12, a display unit 14, a camera 20, a communication interface 22, and a controller 30. The interface is described as "I/F" in the following.

The operation unit 12 is equipped with a plurality of keys. The user can input various instructions to the code reader 10 by operating the operation unit 12. The display unit 14 is a display for showing various information. The display unit 14 may also function as a touch panel (i.e., operation unit 12) that can accept user operations. The camera 20 includes a light source, such as an LED light, and a CCD image sensor. The communication I/F 22 is an I/F for executing communication via LAN 4. The communication I/F 22 is communicably connected to LAN 4.

The controller 30 has a CPU 32 serving as a processor and a memory 34 (which functions as a non-transit computer readable recording medium) composed of a nonvolatile memory or the like. The CPU 32 executes various processes according to a program 40 stored in the memory 34. The memory 34 further stores learning information 50 about machine learning using a multilayer neural network. The multilayer neural network is a function consisting of an input layer, an intermediate layer, and an output layer, and data input to the input layer is processed by the intermediate layer and output from the output layer. The multilayer neural network is, for example, a convolutional neural network, an all-connected neural network, etc. In addition, machine learning is not limited to multilayer neural networks, for example, support vector machines may be used. The multilayer neural network and the like are known techniques and are not described in detail here.

The learning information 50 includes a learning model 52 and model parameters 54. The learning model 52 is a model (i.e., a mathematical formula) of a multilayer neural network. The model parameters 54 are the parameter of the learning model 52, specifically, the values of the various weights in the intermediate layer of the learning model 52. The learning model 52 is installed, for example, from a server (not shown) provided by the vendor of the information reading system 2. In the deformation example, the learning model 52 may be pre-stored in the memory 34 at the shipping stage of the code reader 10. The model parameters 54, on the other hand, are generated by a learning device 200 and stored in the memory 34.

The learning device 200 is a device that adjusts a model parameter 254 of a learning model 252. The learning device 200 is, for example, a server. The learning device 200 has a communication I/F 222 and a controller 230. The communication I/F 222 is communicably connected to LAN 4.

The controller 230 has a CPU 232 and a memory 234. The CPU 232 executes various processes according to a program 240 stored in the memory 234. The memory 234 further stores a plurality of training data 242 and learning information 250. The learning information 250 includes the learning model 52 similar to that in the code reader 10, the model parameter 254 similar to the code reader 10, and an initial parameter 256. The initial parameter 256 is the initial value of the model parameter 254 (i.e., the initial value of the various weights in the intermediate layer). The initial parameter 256 is predetermined, for example, by the vendor of the information reading system 2.

The training data 242 is information used to adjust the model parameter 254. For example, the model parameter 254 is adjusted to minimize the error between the output of the learning model 252 when inputting the training data 242 and the value of the correct answer indicated by the training data 242, for each of the multiple training data 242.

Figure 3:
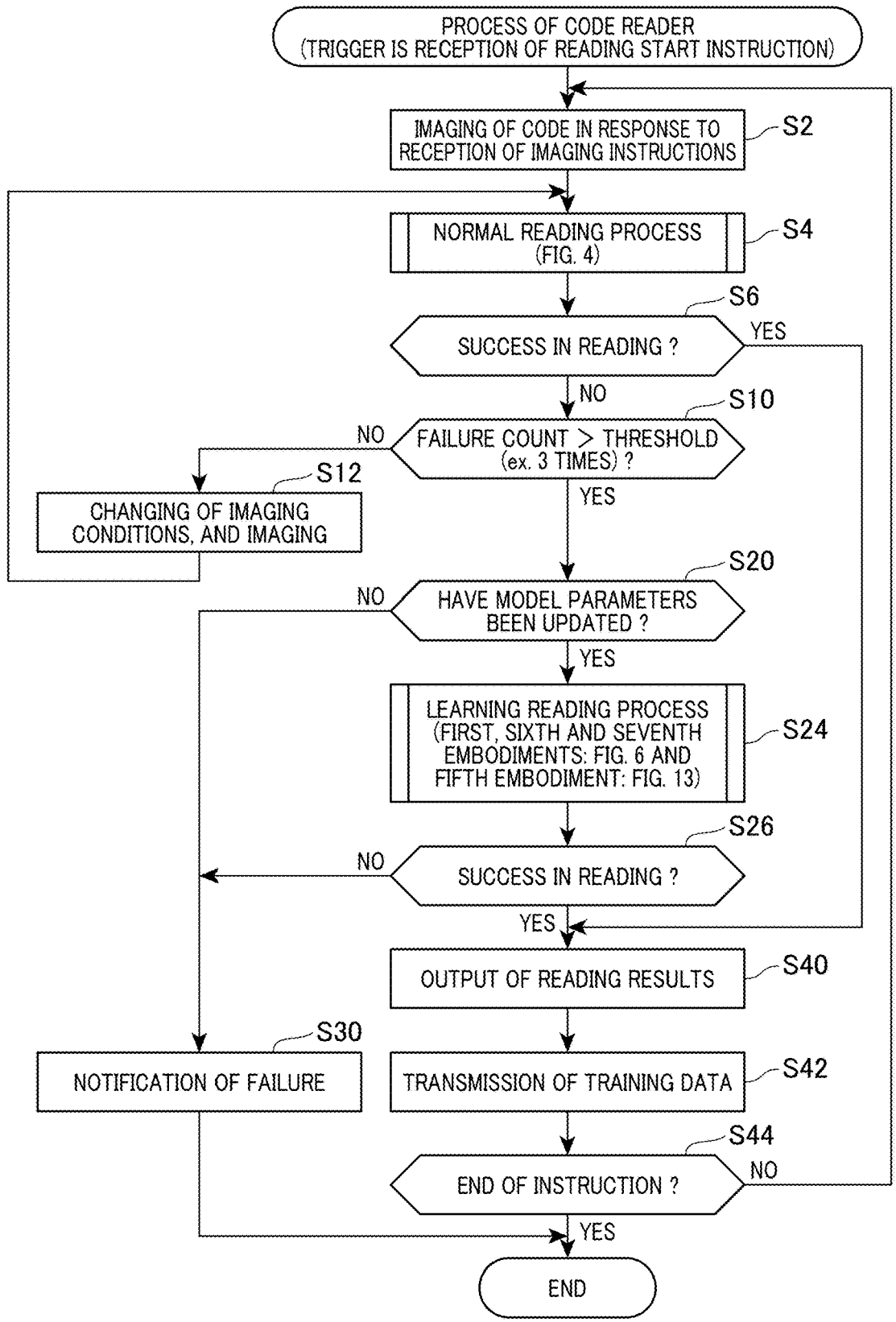
FIG. 3 is a flowchart showing processes executed by a code reader.

(Processing of the Code Reader 10: FIG. 3)

Referring to FIG. 3, the process performed by the CPU 32 of the code reader 10 according to the program 40 is described. The process in FIG. 3 is triggered when the code reader 10 accepts, via the operation unit 12, an instruction to start reading a two-dimensional code.

When the CPU 32 receives an instruction to capture an image via the operation unit 12 in step S2, it controls the camera 20 to capture an image of the two-dimensional code displayed on a specific medium (e.g., metal, etc.). This causes the CPU 32 to acquire the captured image data indicating the captured image, which is the image that has already been captured from the camera 20.

In the step S4, the CPU 32 executes a normal reading process (i.e., a normally used known reading process) to read the information recorded in the two-dimensional code from the captured image indicated by the acquired captured image data. Details of the normal reading process will be described later in FIG. 4.

In the following step S6, the CPU 32 determines whether the information in the normal reading process was successfully read or not. If the CPU 32 determines that the information is successfully read in the normal reading process (YES in step S6), the CPU 32 makes its processing proceed to step S40. On the other hand, if the CPU 32 determines that the reading of information in the normal reading process has failed (NO in step S6), it proceeds to step S10.

In step S10, the CPU 32 determines whether the number of times that information reading failed in the normal reading process in response to the instruction for imaging in step S2 is greater than a predetermined threshold value (e.g., 3 times). When the CPU 32 determines that the number of failures is less than the threshold value (NO in step S10), it proceeds to step S12.

In step S12, the CPU 32 changes the conditions of the imaging of camera 20 (e.g., sensitivity, exposure time, presence of light emitting source, strength of light emitting source, etc.) and re-images the two-dimensional code. The CPU 32 returns to step S4 when the process at step S12 is completed.

If the CPU 32 determines that the number of failures is greater than the threshold value (YES in step S10), the processing is made to proceed to step S20. In step S20, the CPU 32 determines whether the model parameter 54 in the memory 34 have been updated. The model parameter 54 are updated when the adjusted model parameter 254 are received from the learning device 200 and the adjusted model parameter 254 are stored in the memory 34 as the model parameter 54. If the CPU 32 determines that the model parameter 54 have been updated (YES in step S20), the processing is made to proceed to step S24.

In step S24, the CPU 32 executes a learning reading process to read the information recorded in the two-dimensional code from the captured image indicated by the captured image data acquired from the camera 20. The learning reading process is different from the normal reading process in step S4 and uses the learning information 50. The details of the learning reading process will be described below in FIG. 6.

In the following step S26, the CPU 32 determines whether the information in the learning reading process was successfully read or not. When the CPU 32 determines that the information in the learning reading process has been successfully read (YES in step S26), the CPU 32 proceeds to step S40.

In step S40, the CPU 32 outputs one of the reading results of the normal reading process in step S4 and the learning reading process in step S26. For example, the CPU 32 displays an image showing the reading results on the display unit 14. The CPU 32 also sends data indicating the reading results to an external device (e.g., PC, etc.).

In step S42, the CPU 32 sends the successful cases of either process to the learning device 200 as the training data 242 in the situation where the two-dimensional code is successfully read in either the normal reading process of step S4 or the learning reading process of S26. The details of the training data 242 (i.e., successful cases) are described below in FIG. 5.

In the following step S44, the CPU 32 determines whether or not to accept an instruction to terminate the reading of the two-dimensional code via the operation unit 12. When the CPU 32 determines that the instruction to finish reading the two-dimensional code has been received (YES in step S44), the process in FIG. 3 is terminated. On the other hand, when the CPU 32 determines that it has not received an instruction to finish reading the two-dimensional code (NO in step S44), the processing is made to return to step S2 where captures the two-dimensional code again.

When the CPU 32 determines that the model parameters 54 have never been updated (NO in step S20), and when it determines that the reading of information in the learning reading process failed (NO in step S26), the CPU 32 proceeds to step S30. The CPU 32 displays a failure notice on the display unit 14 indicating that reading information from the two-dimensional code has failed in step S30. After the process at step S30 is completed, the process in FIG. 3 is terminated.

Figure 4:
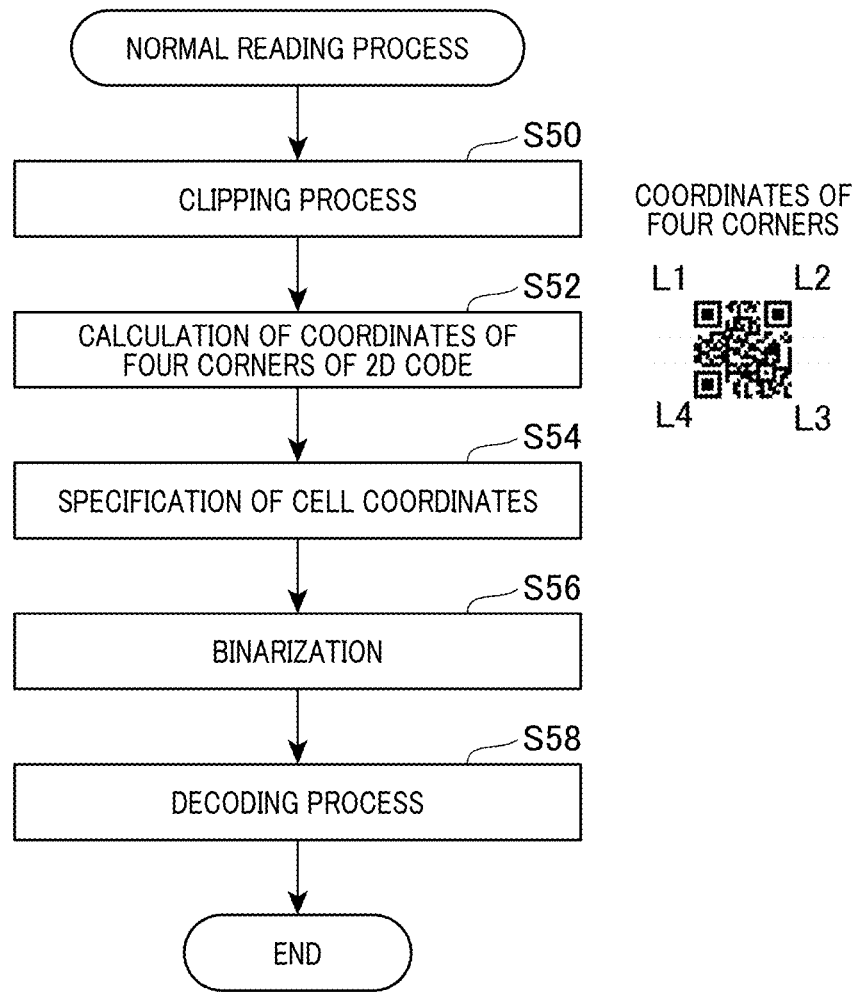
FIG. 4 is a flowchart showing a normal reading process (normally used known reading process)

(Normal Reading Process: FIG. 4)

Referring to FIG. 4, the normal reading process (i.e., a normally used known reading process) executed in step S4 of FIG. 3 will now be explained. In step S50, the CPU 32 executes a clipping process to crop a code image, which is an image showing a two-dimensional code, from the captured image by a predetermined number of pixels. Specific examples of the clipping process are described below in FIGS. 22 to 24.

In step S52, the CPU 32 identifies the symbol marks (also called finder patterns) located in three of the four corners of the two-dimensional code from the code image clipped (cut out) in step S50. The CPU 32 calculates the position coordinates L1, L2, and L4 of the points indicating three of the four corners of the two-dimensional code from the three symbol marks already identified. The CPU 32 then calculates the remaining position coordinates L3 from the three calculated position coordinates L1, L2, and L4. This calculates the position coordinates L1 to L4 (hereafter simply referred to as the four corner position coordinates L1 to L4) of the points indicating the four corners of the two-dimensional code. In the figure, these coordinates are simply noted as coordinates L1 to L4 for the four corners.

In step S54, the CPU 32 identifies the position coordinates of each cell comprising the two-dimensional code based on the position coordinates L1-L4 of the four corners calculated in step S52.

In step S56, the CPU 32 executes the binarization process for the code image. This determines each cell of the two-dimensional code to be either white or black cell.

In step S58, the CPU 32 executes a code process to decode the two-dimensional code based on the position coordinates of each cell identified in step S54 and the black and white value of each cell determined in the binarization process of step S56. The decoding process can include an error correction process. The error correction process restores the original two-dimensional code from the position coordinates of each cell and the black and white values of each cell when there are differences between the original two-dimensional code and the two-dimensional code in the captured image due to dirt on a part of the two-dimensional code. If two-dimensional code decoding fails even though error correction processing has been performed multiple times in the decoding process, the two-dimensional code reading by the process in FIG. 4 will also result in failure. On the other hand, otherwise, the reading of the two-dimensional code by the process of FIG. 4 will be successful. After the process at step S58 is completed, the processing in FIG. 4 is terminated.

(Process of Learning Device 200: FIG. 5)

Referring to FIG. 5, the process performed by the CPU 232 of the learning device 200 according to the program 240 is described. The process shown in FIG. 5 is triggered by receiving the training data 242 from the code reader 10. The training data 242 is received from one of the two code readers 10.

In the example of deformation, the training data 242 may be received from both of the two code readers 10.

In step S60, the CPU 232 stores the training data 242 received from the code reader 10 in the memory 234. Here, the training data 242 in this example includes the code image data indicating the code image clipped in step S50 and the position coordinates L1-L4 of the four corners calculated in step S52 as successful cases of the normal reading process shown in FIG. 4. The training data 242 can also include successful cases of the learning reading process in FIG. 6, described below.

In step S62, the CPU 232 determines whether the number of training data 242 stored in the memory 234 is greater than or equal to the target number (e.g., 100). When the CPU 232 determines that the number of training data 242 is greater than or equal to the target number (YES in step S62), the processing proceeds to step S64. On the other hand, if the CPU 232 determines that the number of training data 242 is less than the target number (NO in step S62), the process in FIG. 5 is terminated.

In step S64, the CPU 232 performs the learning process to adjust the model parameter 254 of the learning model 252 using the plurality of training data 242 stored in the memory 234 (i.e., referring to the training data 242). In this embodiment, the learning model 252 is a model that inputs code image data to the input layer and outputs the estimated values of the position coordinates of the four corners of a two-dimensional code (the position coordinates of the points indicating the four corners) from the output layer.

In the training process of step S64, the CPU 232 selects one training data 242 from the plurality of training data 242 and inputs the code image data in the selected one training data 242 to the input layer of the learning model 252. This will output estimated values of the position coordinates of the four corners of the two-dimensional code from the output layer of the learning model 252. The CPU 232 executes an adjustment process to adjust the model parameter 254 of the middle layer of the learning model 252 so that the difference between the position coordinates L1-L4 of the four corners in one selected training data 242 and the estimated value outputted from the learning model 252 is minimized.

The CPU 232 performs the adjustment process for all of the multiple training data 242. The multiple training data 242 used in the training process are deleted from the memory 234. When a target number or more of training data 242 is again stored in the memory 234, the learning process is again executed. This allows the model parameter 254 to be adjusted iteratively.

The frequency of execution of the learning process is not limited to the above example, but the learning process may be executed every time the training data 242 is received from the code reader 10.

In step S66, the CPU 232 performs a verification process to validate the accuracy of the model parameter 254 updated in step S64. Specifically, the CPU 232 inputs code image data indicating a pseudo code image to the learning model 252 to obtain the estimated values of the position coordinates of the four corners of the pseudo code image. The CPU 232 executes the same process as steps S54-S58 shown in FIG. 4 for the pseudo code image using the obtained estimated value (i.e., based on the estimated value), and executes reading of the two-dimensional code indicated by the pseudo code image. The CPU 232 counts the number of error correction processes performed in reading the pseudo two-dimensional code.

The CPU 232 determines the verification result "OK" indicating that the accuracy of the model parameter 254 is good when the number of counts is less than a predetermined number of times (e.g., two times). On the other hand, the CPU 232 determines the verification result "NG", which indicates that the accuracy of model parameter 254 is not good, if the number of counts is greater than a predetermined number.

In this example of deformation, the verification process is not limited to verification based on the number of error correction processes, but may also be based on the difference between the estimated values of the position coordinates of the four corners according to the learning model 252 and the actual position coordinates of the four corners of the pseudo code image.

In step S68, the CPU 232 determines whether the result of the verification in step S66 indicates "OK" or not. If the CPU 232 determines that the verification result indicates "OK" (YES in step S68), it proceeds to step S70. On the other hand, if the CPU 232 determines that the verification result indicates "NG (no good)" (NO in step S68), it skips the process to step S70 and terminates the process in FIG. 5.

At step S70, the CPU 232 sends the model parameter 254 adjusted in step S64 to the code reader 10. The adjusted model parameter 254 is sent not only to the first code reader 10, which is the source of the training data 242, but also to the second of the two code readers 10, which is not the above source. According to this configuration, a learning reading process (see FIG. 6) can be performed in the second code reader 10 using successful cases in another code reader 10.

Figure 6:
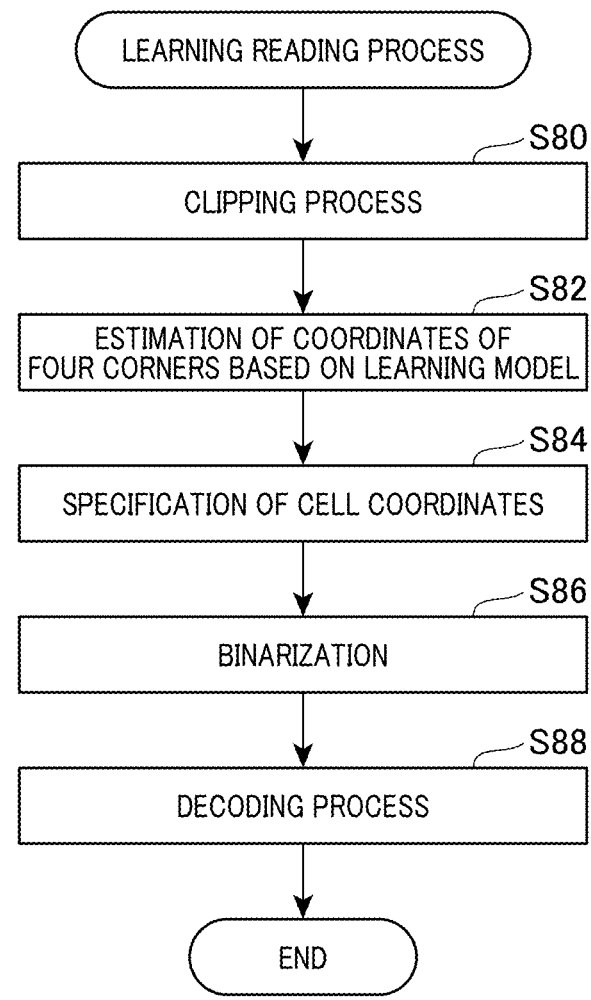
FIG. 6 is a flowchart showing a learning reading process.

In an example of deformation, it is not always required to send the adjusted model parameters 254 to the second code reader 10. When the process at step S70 is completed, the processing in FIG. 5 is terminated.
(Learning Reading Process; FIG. 6)

Referring to FIG. 6, the learning reading process in step S24 of FIG. 3 is explained. Step S80 is the same as step S50 in FIG. 4. In step S82, the CPU 32 of the code reader 10 inputs the code image data indicating the code image clipped in step S80 to the learning model 52 in the memory 34 and obtains the estimated value of the position coordinates of the four corners of the code image from the learning model 52. Steps S84 to S88 are identical to steps S54 to S58 in FIG. 4, except that the estimated value obtained in S82 is used. When the process at step S88 is completed, the processing in FIG. 6 is terminated.

Effect of the Present Embodiment

According to the configuration of this embodiment, the learning device 200 refers to the training data 242, which contains multiple successful cases of the decoding process using the position coordinates L1-L4 of the four corners of the two-dimensional code calculated by step S52 of the normal reading process in FIG. 4, and adjusts the model parameter 254 of the learning model 252 that outputs the estimated value of the position coordinates of the four corners of the two-dimensional code from the image of the two-dimensional code (step S64 in FIG. 5). The code reader 10 executes the learning reading process (step S24) when the reading in the normal reading process fails (NO in step S10 after step S12 in FIG. 3), although the imaging conditions are changed. In the learning reading process, instead of the calculation by step S52 in the normal reading process, the process of outputting the estimated value of the position coordinates of the four corners with reference to the learning model 52 is executed (step S82 in FIG. 6). For example, it is assumed that reading by the normal reading process fails due to a failure in the calculation of the position coordinates L1-L4 of the four corners of the two-dimensional code due to aging deterioration of the two-dimensional code. In this embodiment, even if the calculation of the position coordinates L1-L4 at the four corners of the two-dimensional code fails due to age-related deterioration of the two-dimensional code, the information in the two-dimensional code can still be read by executing the learning reading process.

For example, a comparative example in which the information reading system 2 is not equipped with the learning device 200 and the code reader 10 performs the process shown in FIG. 6 is assumed. In this comparison example, the code reader 10 performs not only the reading of the two-dimensional code, but also the adjustment of the model parameter 54 of the learning model 52. In contrast, according to the configuration of this embodiment, the adjustment of the model parameters 254 of the learning model 252 is performed by the learning device 200, which is separate from the code reader 10. This allows the adjustment of model parameters 254 to be performed without increasing the processing power of the CPU 32 of the code reader 10. In the example of deformation, the above comparative example configuration may be used.
(Correspondence Relationship)

The information reading system 2 is an example of an "information reader". The two code readers 10 in FIG. 2, one of them, and the other of them, are examples of "one or more code readers," "first code reader," and "second code reader," respectively. The camera 20 is an example of a "camera".

The learning device 200 is an example of a "learning device". The two-dimensional code is an example of an "information code (first information code and second information code). The position coordinates L1-L4 at the four corners of the two-dimensional code are examples of "first relationship information". The estimated value of the position coordinates of the four corners of the two-dimensional code are an example of "relational information (and second relationship information)". The training data 242, the learning model 252, and the model parameter 254 are examples of "training data," "learning model," and "parameter" respectively. The process in FIG. 4 and step S40 in FIG. 3 are examples of a "first code process". Steps S52 and S58 in FIG. 4 and step S40 in FIG. 3 are examples of a "detection process," "reading process," and "output process," respectively. The process in FIG. 6 and step S40 in FIG. 3 are examples of a "second code process. Step S82 in FIG. 6 is an example of an "acquisition process.

The controller 30 of the code reader 10 is an example of a "first code process execution unit" and a "second code process execution unit". The controller 230 of the learning device 200 is an example of an "adjustment unit".

Second Embodiment

Figure 7:
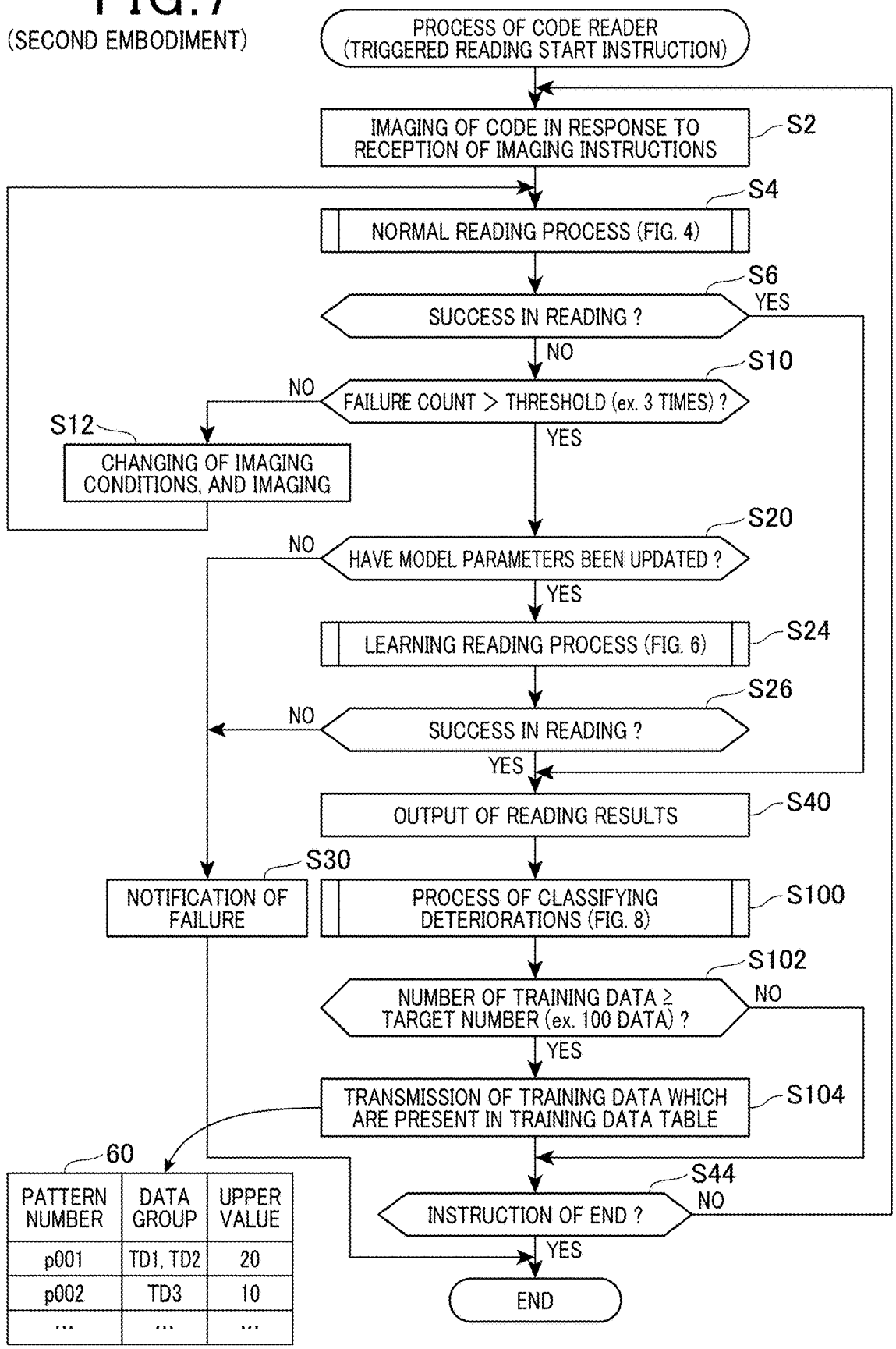
FIG. 7 is a flowchart showing a reader in a second embodiment.

This embodiment is identical to the first embodiment, except that the processing of code reader 10 is partially different, so that the identical components to those employed in the first embodiment are assigned to the same reference numbers and symbols.
(Process of the Code Reader 10: FIG. 7)

The process of code reader 10 in this embodiment is identical to the process of code reader 10 in the first embodiment in FIG. 3, except that processing steps S100-S102 is added and processing step S104 is performed instead of step S42. The same process as in the first embodiment is indicated by the same code, and the same applies to each of the examples described below.

As shown in FIG. 7, when the CPU 32 outputs the reading results in step S40, the CPU 32 executes a deterioration classifying process in step S100. The deterioration classifying process classifies the two-dimensional code to be read according to the pattern of deterioration and stores the successful cases corresponding to the results of reading the two-dimensional code in training data 60 as the training data 242. The pattern of deterioration is based on the presence or absence of staining, defects, deteriorated location, etc. The deterioration classifying process is described below in FIG. 8.

The training data 60 is stored in the memory 34 of code reader 10. As shown in FIG. 7, the training data 60 is a table that stores a pattern number (e.g., "p001"), a group of data (e.g., "TD1, TD2"), and an upper limit (e.g., "20") for each of multiple patterns of degradation. The pattern number is a number that identifies the corresponding pattern of deterioration. The data group is one or more training data 242 classified as a pattern of corresponding deterioration. The upper limit is the maximum number of training data 242 that can be stored in the corresponding pattern of deterioration.

In the following step S102, the CPU 32 determines whether the number of training data 242 stored in the training data 60 is greater than or equal to the target number. Here, the target number is the same as the target number in step S62 of FIG. 5, for example. When the CPU 32 determines that the number of training data 242 is greater than or equal to the target number (YES in step S102), it proceeds to step S104. On the other hand, if the CPU 32 determines that the number of training data 242 is less than the target number (NO in S102), the CPU 32 skips the process in step S104 and proceeds to step S44.

In step S104, the CPU 32 sends all of the training data 242 in the training data 60 to the learning device 200. When the process at step S104 is completed, the CPU 32 proceeds to step S44.

Figure 8:
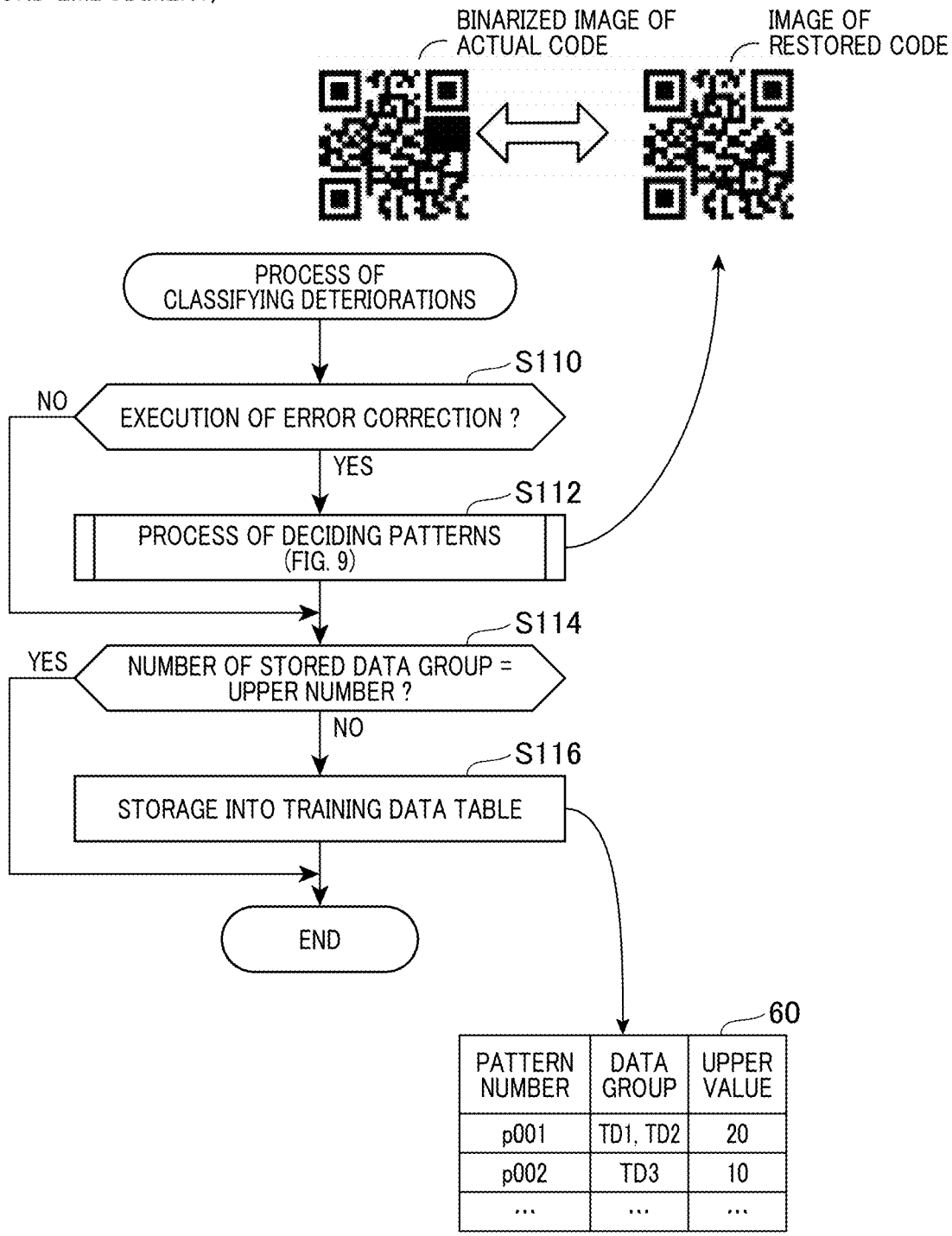
FIG. 8 is a flowchart explaining a deterioration classifying process.

(Deterioration Classifying Process: FIG. 8)

Referring to FIG. 8, the deterioration classifying process of step S100 in FIG. 7 is explained. At step S110, the CPU 32 determines whether error correction process was performed in the normal reading process at step S4 or the learning reading process of step S24 in FIG. 7. When the CPU 32 determines that the error correction process has been executed (YES in step S110), it proceeds to step S112. On the other hand, when the CPU 32 determines that error correction process has not been performed (NO in step S110), it skips processing in step S112 and proceeds to step S114.

In step S112, the CPU 32 compares the image of the restored code, which is the two-dimensional code restored in the error correction process, with the binarized image of the actual code, which is the two-dimensional code actually captured, and executes a pattern determination process to determine the pattern of deterioration of the actual code. The restored code image is represented in binary black and white. The binarized image of a real code is a binarized image of the actual image of the real code. The pattern determination process is described below in FIG. 9. The CPU 32 proceeds to step S114 after the process of step S112 is completed.

In step S114, the CPU 32 determines whether the number of data groups stored in the training data 60 has reached the maximum number corresponding to the target data group. Here, the target data group is associated with a pattern number that identifies a pattern with no determination when no error correction process is performed (NO in step S110). The target data group is also associated with the pattern number that identifies the pattern determined by the pattern determination process when the error correction process is executed (YES in step S110). When the CPU 32 determines that the number of data groups stored in the target data group has not reached the maximum number (NO in step S114), it proceeds to step S116. On the other hand, when the CPU 32 determines that the number of target data groups stored in the target data group has reached the maximum number (YES in step S114), the CPU 32 skips the process in step S116 and terminates the process in FIG. 8.

In step S116, the CPU 32 stores the successful cases corresponding to the reading results of step S40 in FIG. 7 in the training data 60 as training data 242. When the process at step S116 is completed, the processing in FIG. 8 is terminated.

For example, a comparative example in which all of the successful cases are stored in the training data 60 as training data 242 without executing the decision in step S114 is envisioned. According to the configuration of this embodiment, the number of training data 242 stored in the training data 60 can be limited by the decision in step S114. Compared to the comparative example, the amount of memory 34 used to store the training data 60 can be reduced. In a modification, the configuration of the comparative example may be adopted.

Figure 9:
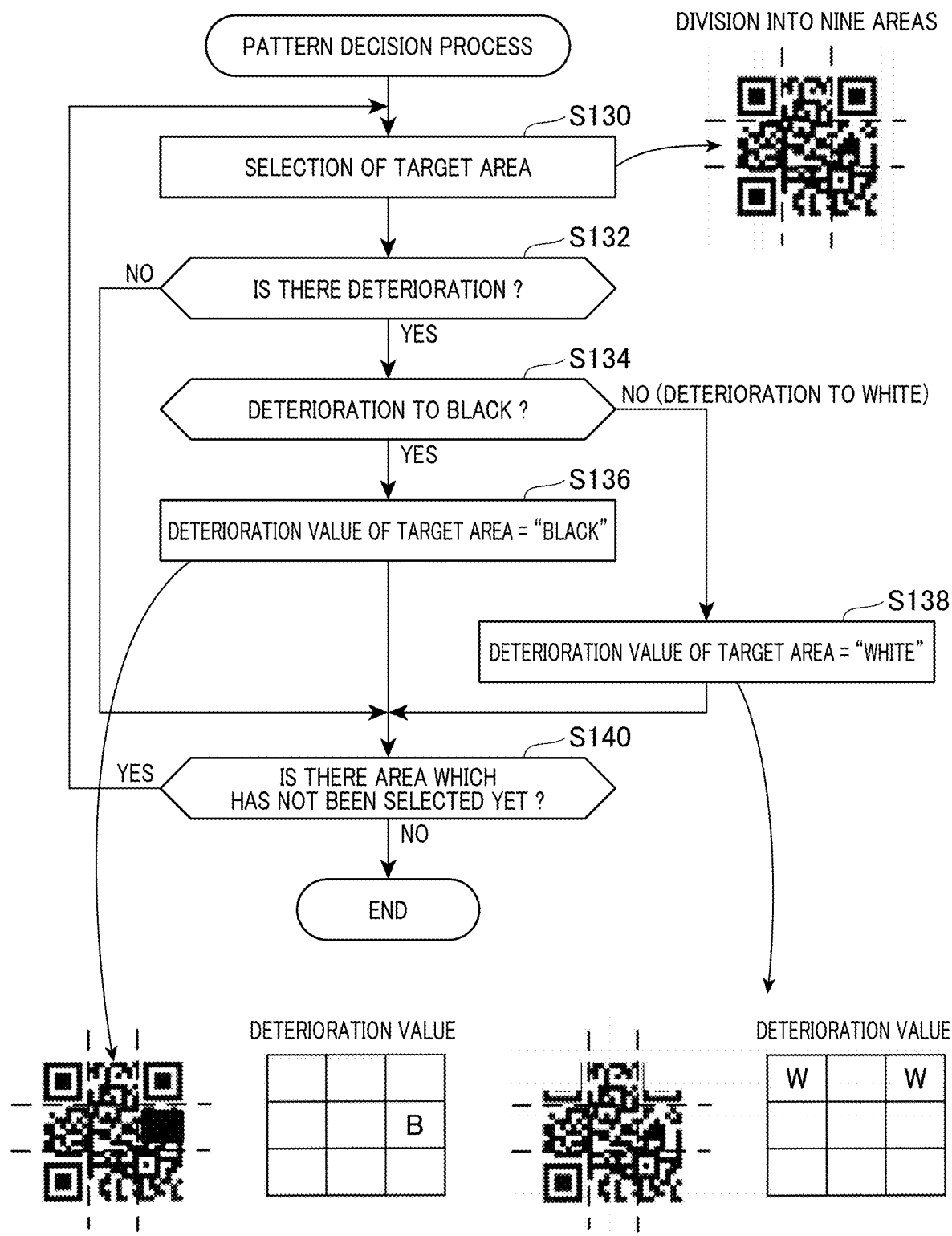
FIG. 9 is a flowchart explaining a pattern determination process.

Referring to FIG. 9, the pattern determination process of step S112 in FIG. 8 is explained. In this embodiment, the two-dimensional code is equally divided into 9 regions to classify deteriorated locations. Each of the 9 regions is associated with a deterioration value, which is a value indicating the type of deterioration. In step S130, the CPU 32 determines one of the 9 regions as the target region. The number of divisions of a region is not limited to 9, but may be 4, 12, etc., for example. The division of regions is not limited to equal divisions; for example, the size of the regions may differ from each other.

In step S132, the CPU 32 determines whether there is a difference between the target area of the restored code image and the target area of the real code binary image. The difference between the target area of the restored code image and the target area of the binarized image of the real code means that the target area of the imaged two-dimensional code is deteriorated. If the CPU 32 determines that there is a difference between the target areas of both codes (YES in step S132), it proceeds to step S134. On the other hand, if step CPU 32 determines that there is no difference between the target areas of both codes (NO in step S132), steps S134-S138 are skipped and the processing proceeds to step S140.

In step S134, the CPU 32 determines whether the difference between the target areas of both codes is a difference corresponding to black deterioration or white deterioration. The black deterioration is a deterioration in which the white cells of the two-dimensional code turn into black. The black degradation is, for example, staining of black ink on a two-dimensional code. Meanwhile, the white deterioration is a deterioration in which the black cells of the two-dimensional code turn into white. The white deterioration is, for example, stains from white ink adhering to the two-dimensional code and loss of black cells in the two-dimensional code.

If the CPU 32 determines that the difference between the target areas of both codes is a difference corresponding to black deterioration (YES in step S134), it proceeds to step S136. In step S136, the CPU 32 determines the deterioration value corresponding to the target area to be "black," a value indicating black deterioration. On the other hand, if the CPU 32 determines that the difference between the target areas of both codes is a difference corresponding to white deterioration (NO in step S134), it proceeds to step S138. In step S138, the CPU 32 determines the deterioration value corresponding to the target area to be "white," a value indicating white deterioration. When either step S136 or S138 is completed, the CPU 32 proceeds to step S140.

In step S140, the CPU 32 determines whether or not there is an unselected region as a target region among the nine regions. When the CPU 32 determines that there is an unselected area as a target area (YES in step S140), it returns to step S130. On the other hand, the CPU 32 terminates the process in FIG. 9 when there is no area that has not been selected as a target area, i.e., when steps S132-S138 processes have been executed for all the nine areas (NO in step S140).

Effect of this Embodiment

In order to ensure the reliability of the model parameters 254, it is required that successful cases be, in number, over the target number (e.g., 100). However, if successful cases are adopted unconditionally as the training data 242, at times when the number of training data 242 exceeds the target number, the variation in successful cases may be biased toward cases in a particular pattern of degradation (e.g., black degradation in a particular area), for example. According to the configuration of this embodiment, the code reader 10 classifies successful cases of the two-dimensional code to be read by the pattern of deterioration of the two-dimensional code (step S112 in FIG. 8). Then, based on the classification result, the code reader 10 determines whether to store the successful cases of the two-dimensional code to be read in the training data 60 as training data 242 (step S114). This can prevent successful cases as the training data 242 from being biased toward cases with a particular pattern of deterioration.

In the present embodiment, the presence or absence of stains, defects, and deteriorated location are used in the classification of patterns of deterioration.

By way of a modification, contrast may be used in classifying patterns of deterioration. For example, the pattern of deterioration may be classified based on the value of the difference between the upper and lower limits of the luminance value of the code image in the step S50 of FIG. 4 or the step S80 clipping process of FIG. 6. For example, the successful cases of the two-dimensional code to be read may be classified into the first pattern when the value of the difference is within the first value range. The successful cases of the two-dimensional code to be read may also be classified as the second pattern if the value of said difference is within a second value range different from the first value range. This modification can classify deterioration based on contrast, which cannot be classified by deterioration due to dirt adhesion or defects. Other modifications may combine classification based on dirt adhesion or loss with classification based on contrast to classify the deterioration of two-dimensional codes.

In other modifications, the deformation of the information code may be used in the classification of patterns of deterioration. Deformation of the information code is, for example, the fattening and thinning phenomenon in FIG. 16, the distortion phenomenon in FIG. 17, and the pitch-shift phenomenon in FIG. 18. Deformation of information codes occurs, for example, due to deterioration of the printing equipment that prints the two-dimensional codes or unstable support of the media on which the information codes are printed during printing.

Figure 16:
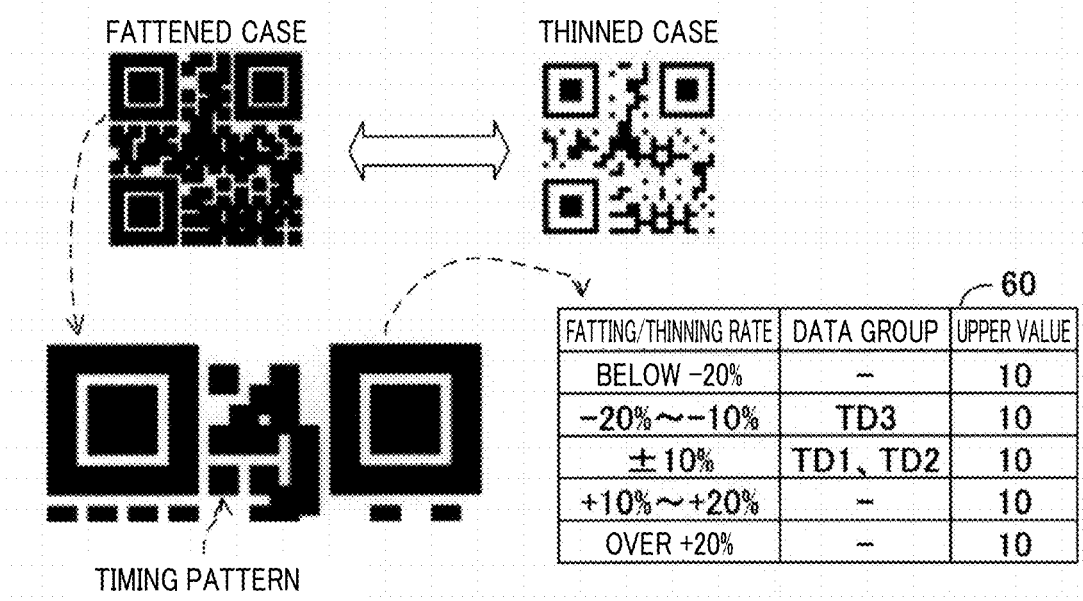
FIG. 16 is an illustration explaining classification of fatting and thinning phenomena of cells.

(Classification by Fattening and Thinning Phenomenon: FIG. 16)

A fattening and thinning phenomenon include fattening and thinning phenomena. Fattening is a phenomenon in which the actual width of a black cell is thicker than the ideal width. On the other hand, the thinning phenomenon is a phenomenon in which the actual width of a black cell is narrower than the ideal width.

The fattening/thinning ratio, which indicates the degree of fattening and thinning phenomenon, is calculated by analyzing the timing patterns of the two-dimensional code. The timing pattern is used to identify the position coordinates of the symbol. The timing pattern is an alternating pattern of white and black cells. The fattening/thinning ratio in the horizontal direction is calculated as a ratio of the difference between the total width of the black cells in the horizontal timing pattern and the total width of the white cells in the horizontal timing pattern to the total length of the horizontal timing pattern in the horizontal direction. The fattening/thinning ratio "0%" in the transverse direction means that the fattening and thinning phenomenon is not occurring. A positive value for the fattening/thinning ratio in the transverse direction means that a fattening phenomenon is occurring in the transverse direction. A negative value for the fattening/thinning ratio in the transverse direction means that the thinning phenomenon is occurring in the transverse direction. The fattening/thinning ratio in the vertical direction is calculated in the same way as the fattening/thinning ratio in the horizontal direction, using the vertical timing patterns (i.e., based on the timing patterns). The fattening/thinning ratio of the entire two-dimensional code is calculated, for example, as the average of the fattening/thinning ratio in the horizontal direction and the fattening/thinning ratio in the vertical direction. In the modification, the larger of the fattening/thinning ratio in the horizontal direction and the fattening/thinning ratio in the vertical direction may be used as the overall fattening/thinning ratio, or only one of the fattening/thinning ratio in the horizontal direction and the fattening/thinning ratio in the vertical direction may be used.

In this modification, the CPU 32 classifies successful cases of two-dimensional codes to be read based on the overall fattening/thinning ratio and stores them in the training data 60 (see step S116 in FIG. 8). For example, as shown in FIG. 16, successful cases of the two-dimensional code to be read are classified based on five value ranges of the overall fattening/thinning ratio. It is noted that the five value ranges in FIG. 16 are only one example.

Figure 17:
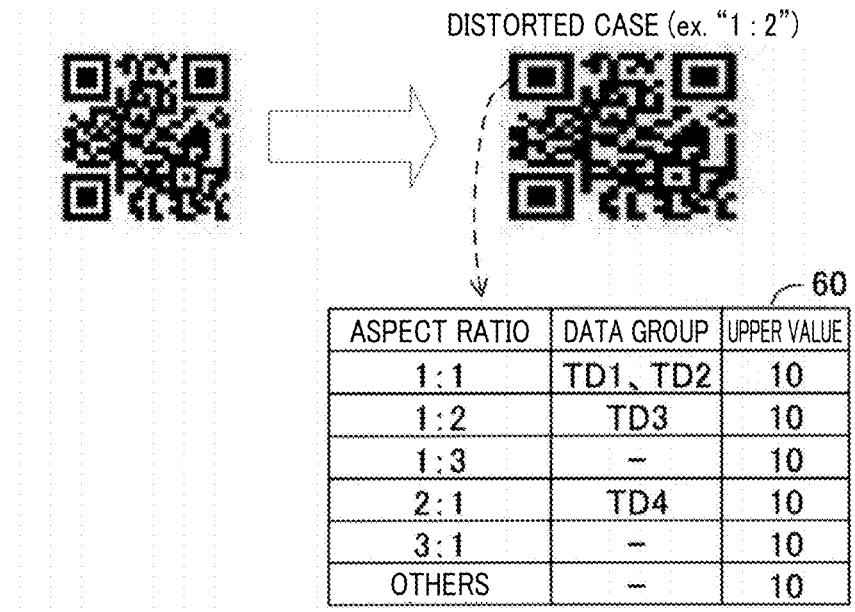
FIG. 17 is an illustration explaining classification a distortion phenomena of cells.

(Classification Based on Distortion Phenomenon: FIG. 17)

Generally, the ratio of the vertical to horizontal length of a two-dimensional code (hereafter referred to as "aspect ratio") is 1:1. The distortion phenomenon is a phenomenon in which the horizontal length of a two-dimensional code is distorted relative to the vertical length of the two-dimensional code, causing the aspect ratio to change from 1:1. The aspect ratio is calculated as the ratio of the distance between the centers of vertically adjacent cells to the distance between the centers of horizontally adjacent cells.

In this modification, the CPU 32 classifies successful cases of two-dimensional codes to be read based on aspect ratio and stores them in the training data 60 (see step S116 in FIG. 8). For example, as shown in FIG. 17, successful cases of two-dimensional codes to be read are classified based on six patterns of aspect ratio. It is noted that the six patterns in FIG. 17 are only one example.

(Classification by Pitch-Shift Phenomenon: FIG. 18)

In general, the cells that make up a two-dimensional code are lined up at regular intervals (i.e., pitch) in the vertical and horizontal directions. The pitch-shift phenomenon is a phenomenon in which the pitch of adjacent cells deviates from the ideal pitch, which is the fixed interval described above. The pitch-shift ratio, which indicates the degree of pitch shift, is calculated as a percentage of the maximum amount of pitch shift relative to the ideal pitch. The amount of pitch-shift is calculated as the absolute value of the difference between the ideal pitch and the distance between the centers of adjacent cells. In a modification, the pitch-shift ratio may be, for example, the ratio of the average amount of pitch shift to the ideal pitch.

In this modification, the CPU 32 classifies successful cases of two-dimensional codes to be read based on the pitch-shift ratio and stores them in the training data 60 (refer to step S116 in FIG. 8). For example, as shown in FIG. 18, successful cases of two-dimensional codes to be read are classified based on four value ranges of the pitch-shift ratio. It is noted that the four value ranges in FIG. 18 are only one example.

(Correspondence Relationship)

The target number in step S102 of FIG. 7 is an example of a "predetermined number". The memory 34 of code reader 10 is an example of "first memory". The controller 30 of code reader 10 that executes the process of step S100 in FIG. 7 is an example of a "classification unit" and a "determination unit".

Third Embodiment

A third embodiment will now be described, in which the processing of the code reader 10 and the processing of the learning device 200 are partly different from those explained in the first embodiment, which still using the same reference numbers as those in the first embodiment.

Figure 10:
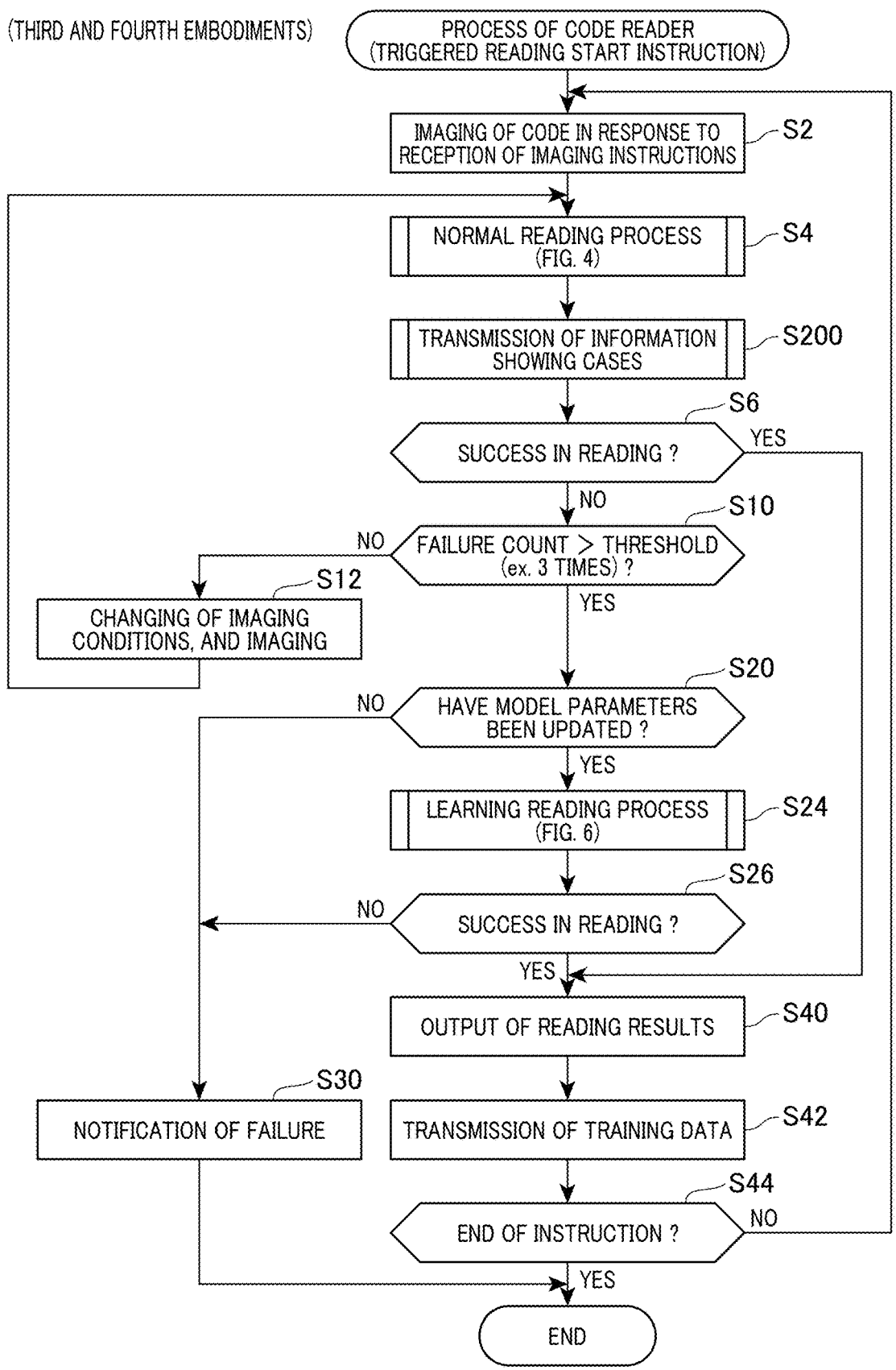
FIG. 10 is a flowchart showing processes executed by code readers provided in third and fourth embodiments.

(Process of Code Reader 10: FIG. 10)

The processing of the code reader 10 in the present embodiment is the same as the processing, in FIG. 3, of code reader 10 performed in the first example, except that the processing of step S200 is added.

As shown in FIG. 10, when the CPU 32 executes the normal reading process in step S4, the PCU 32 transmits, at step S200, case study information on the cases of processing executed in the normal reading process, to the learning device 200. This causes the case information to be stored in a case table 270 (refer to FIG. 11) defined in the memory 234 of the learning device 200. According to this configuration, the case information can be accumulated by storing the case information in the case table 270 each time the normal reading process is executed.

Figure 11:
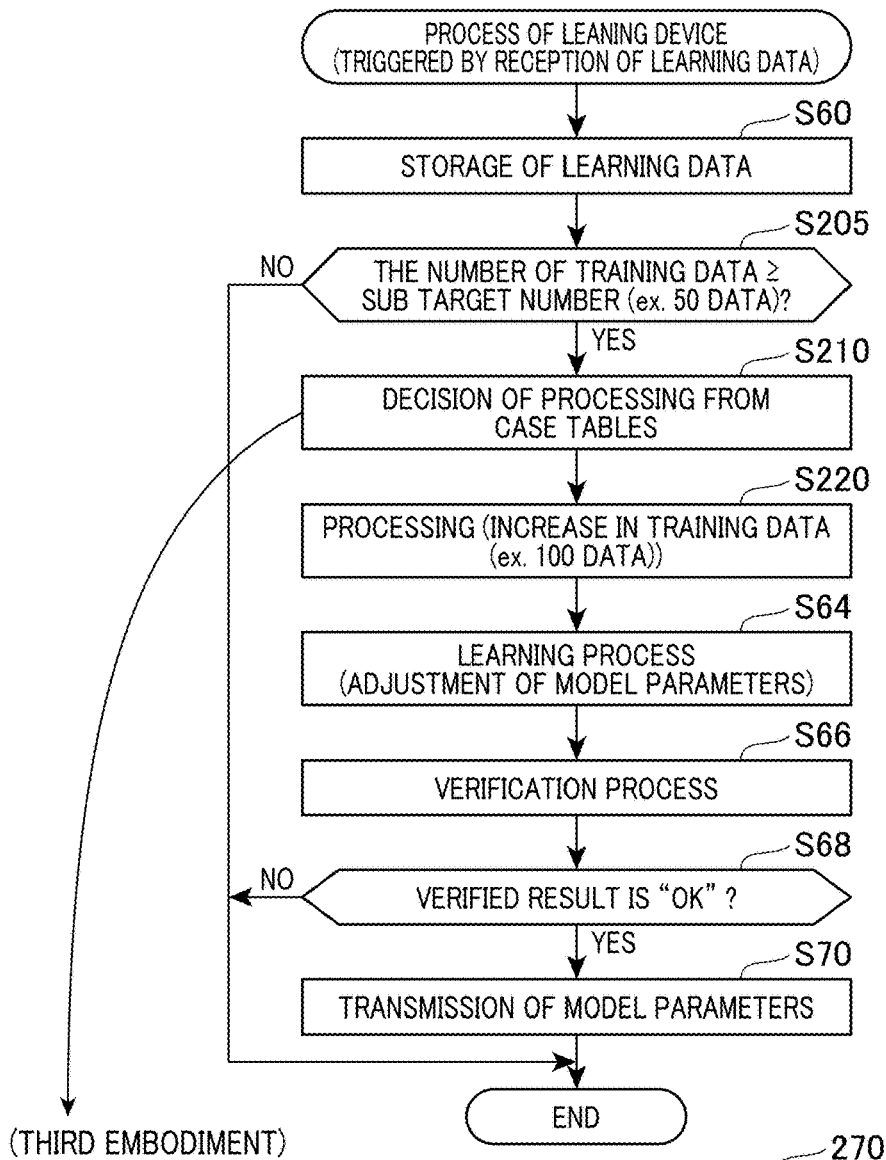
FIG. 11 is a flowchart explaining processes executed by learning devices provided in the third and fourth embodiments.

As shown in FIG. 11, the case table 270 is a table that stores therein various processes executed in the normal reading process, and corresponds to processing information indicating the content of the processing, cause information indicating the cause of the processing, and the number of occurrences. The processing information indicates, for example, "symbol" indicating that at least one symbol mark failed to be identified in the normal reading process, "error correction" indicating that an error correction process was executed in the normal reading process, and so on. The cause information indicates the cause of the occurrence of the corresponding process, for example, the type of deterioration (degrading) of cells such as "black deterioration (deterioration of black cells)", "white deterioration (deterioration of white cells)", etc. (Refer to FIG. 9). The number of occurrences indicates the number of occurrences of the process indicated by the combination of the corresponding processing information and the corresponding cause information. The number of occurrences is incremented each time a combination of corresponding processing information and corresponding cause information (i.e., case information) is received from code reader 10.

For example, if black degradation of 2D codes is likely to occur in a situation where code reader 10 is used in a given area (e.g., a given factory), the number of occurrences corresponding to the cause information "black degradation" in case table 270 is relatively high. The information provided in the case table 270 allows users to know the tendency of deterioration (degradation) in the situation where the code reader 10 is used.

(Process of Learning Device 200: FIG. 11)

The processing executed by the learning device 200 in the present embodiment is similar to the processing of FIG. 5 of the learning device 200 in the first embodiment, except that step S205 is executed instead of the S62 in FIG. 5 and steps S210 and S220 are added.

Step S205 is similar in processing to step S64 in FIG. 5, except that the determination is made based on the number of sub-targets (e.g., 50), which is less than the target number. When the CPU 232 determines that the number of training data 242 in the memory 234 is greater than or equal to the number of sub-targets (YES in step S62), the CPU 232 proceeds to step S210.

In step S210, the CPU 232 decides one or more processing processes to be performed in step S220 which is described below. The processing process is to process the training data 242 in the memory 234 to generate new training data 242. The information in the case table 270 is used in the processing process. For example, the CPU 32 identifies from the case table 270 case information (i.e., processing information and cause information) that is stored in association with the highest number of occurrences. Then, the CPU 32 determines the processing to be performed in S220 according to the identified case information. Also, the CPU 32 identifies from the case table 270 case information stored corresponding to the next highest number of occurrences, and determines another processing process according to the already identified case information.

For example, the CPU 32 may randomly identify case information from the case table 270. Alternatively, the CPU 32 may determine one processing process or two or more processing processes.

There are various processing processes that process the training data 242. For example, if the identified processing information indicates "symbol" and the identified cause information indicates "white deterioration," the processing process is to perform image processing to discolor part of the symbol mark to white for the code image indicated by the training data 242. Such image processing includes, for example, adding a white image to a part of the symbol mark, reducing or enlarging a part of the plurality of cells constituting the symbol mark. For example, when the identified processing information indicates "error correction," the image processing may target cells other than those constituting the symbol mark.

For example, in addition to the image processing according to the cause information (e.g., "white deterioration"), the CPU 32 may also perform various other image processing on the code image indicated by the training data 242, including processing to adjust the contrast of the code image, rotating the code image, etc. This increases the number of variations of the training data 242 after being processed. When the process of rotating the code image is executed, for example, the values of the position coordinates L1 to L4 at the four corners indicated by the training data 242 may also be converted to values rotated by the same rotation angle as that of the code image.

For example, the CPU 32 may, as a processing process, adjust the contrast of the code image, rotate the code image, or perform other processes, without executing image processing according to the cause information.

In step S220 following step S210, the CPU 32 executes each of the one or more processing processes decided in step S210. The CPU 32 execute one processing process multiple times by, for example, adjusting the location where the white image is to be added, the rotation angle at which the code image is to be rotated, and the like. The CPU 32 executes each of the one or more processing processes multiple times until the number of TRAINING DATA 242 in the memory 234 reaches a predetermined target number (e.g., 100). When step S220 being completed, the CPU 232 proceeds to step S64.

Effect of the Present Embodiment

To ensure the reliability of the model parameter 254, the number of successful cases must exceed the target number (e.g., 100). According to the configuration of the present embodiment, in a situation where the number of successful cases does not exceed the target number, the processing process can be executed to generate virtual successful cases, i.e., virtual training data 242 (in step S220 in FIG. 11). This allows the number of successful cases, i.e., the number of training data 242, to be increased. Hence, thanks to the generated virtual successful cases, even if the number of successful cases does not exceed the target number, the reliability of the model parameters 254 can be ensured. In situations where the actual number of successful cases does not reach the target number, the relatively reliable model parameters 254 can be generated in a speedy manner.

A comparative example that does not have a case table 270, for example, a comparative example that executes a processing process using an image process that has been pre-determined by the administrator of the learning device 200, etc., is also assumed. In such a comparative example, the processing process may correspond to a different case than the actual reading process case. In this regard, according to the configuration of the present embodiment, the actual normal reading process cases are accumulated by the case table 270. The learning device 200 then decides one or more processing processes from the case table 270 (in step S210 in FIG. 11). Hence, the appropriate processing process can be executed with consideration of a trend suggested by the cases of the actual reading process.

(Correspondence Relationship)

The controller 230 of the learning device 200 which executes the process of step S220 in FIG. 11 is an example of an "increase control unit". The memory 234 of the learning device 200 is an example of a "second memory". The controller 230 storing the case information transmitted in step S200 in FIG. 10 into the memory 234 is an example of a "second storage control unit".

Fourth Embodiment (Processing of Both Code Reader 10 and Learning Device 200: FIGS. 10 and 11)

The present embodiment is identical to the third example, except that the multiple case tables 270 (refer to FIG. 11) are used and that, in FIG. 10, the contents of the case information sent at step S200 and the training data 242 sent at step S42 are partially different from each other.

The two-dimensional code to be read has various forms. For example, the two-dimensional code is displayed on various media (e.g., substrates, metal, paper media, etc.). Also, for example, the two-dimensional code is displayed on media by various display methods (e.g., printing, cutting, etc.). Also, for example, the two-dimensional code is generated according to a specific standard among various standards (e.g., standards for size, encryption, etc.). Each of the plurality of case tables 270 corresponds to each of the plurality of types of two-dimensional codes to be read.

The case information transmitted to the learning device 200 in step S200 of FIG. 10 includes, in addition to the information in the third example (i.e., processing information and cause information), specific information for identifying the type of a two-dimensional code to be read in the normal reading process, i.e., the normally used known reading process. The specific information is information that indicates the medium, display method, standard, etc. of a reading target. The specific information is inputted into the code reader 10 by the user who operates the code reader 10, for example.

When the learning device 200 receives the case information including the specific information from the code reader 10, the learning device 200 identifies a single case table 270 from the multiple case tables 270 in the memory 234 based on the specific information in the case information. The received case information is to be stored in the single case table 270. Accordingly, the learning device 200 stores, into the identified single case table 270, the information included in the received case information, based on the specified information in the case information.

In step S42 of FIG. 10, the code reader 10 sends the foregoing specific information together with the training data 242 to the learning device 200.

When the learning device 200 receives the training data 242 and the specific information from the code reader 10, the learning device 200 stores the received training data 242 in the memory 234 as the training data 242 corresponding to the type identified by the received specific information in step S60 in FIG. 11. When the learning device 200 determines that the number of training data 242 corresponding to the received specific information is greater than or equal to a sub-target value (YES at step S205), the learning device 200 proceeds to step S210 and subsequent steps thereafter. Specifically, the learning device 200 identifies a single case table 270 to be used in the learning process of step S64 in FIG. 11, from among the multiple case tables 270 in the memory 234, based on the specific information in the training data 242. Then, the learning device 200 refers to the identified single case table 270 to execute the process from step S210 and subsequent steps thereafter.

According to the configuration of the present embodiment, the case information is accumulated for each of the various types of two-dimensional codes to be read. For example, a specific type of reading target can be read not only at the most recent date and time when the code reader 10 is to be used, but also at a date and time in the past.

Also, the specific type of reading target can be read in an area different from the predetermined area where the code reader 10 is used. According to the configuration of the present embodiment, the processing process (step S220 in FIG. 11) can be executed by referring not only to the most recent date and time and examples of the specific type of two-dimensional code read in the predetermined area, but also to examples of the specific type of two-dimensional code read at past dates and times in different areas, etc.

Fifth Embodiment

The present embodiment is identical to the first example, except that the contents of the training data 242 and the values outputted by the learning model 252 are different from those in the first embodiment, and a part of the learning reading process is different from that of the first embodiment.

Figure 12:
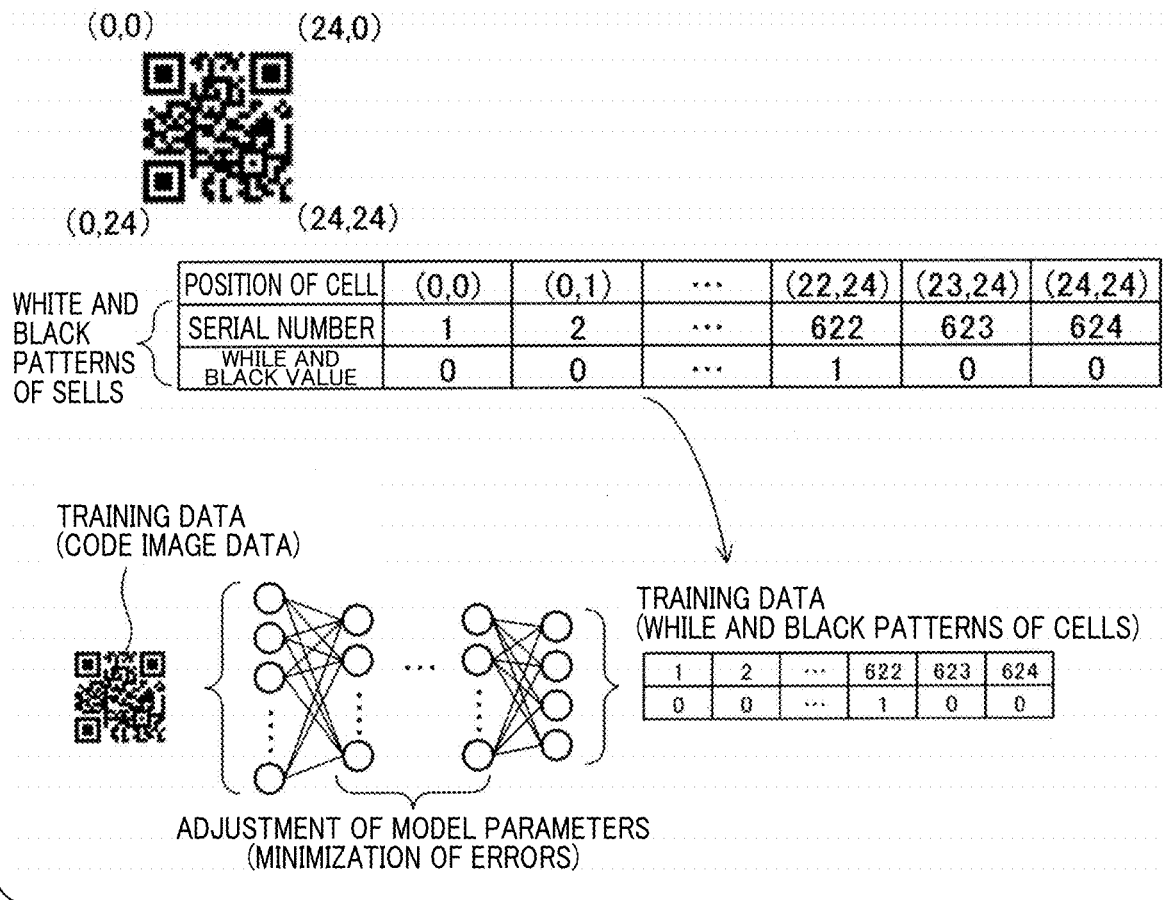
FIG. 12 is an illustration explaining objects to be learned in a fifth embodiment.

(Training Data and Learning Model: FIG. 12)

The learning model 252 in the present embodiment is a model that inputs code image data to an input layer and outputs, from an output layer, an estimated value of the black-and-white pattern of the cells of a two-dimensional code. The data indicating the black-and-white pattern of the cells of the two-dimensional code (hereinafter referred to as "pattern data") is generated, for example, based on the position coordinates of each cell identified in the normal reading process (refer to, for example, step S54 in FIG. 4) and the black/white value of each cell determined in the binary value conversion process of the normal reading process. For example, the position coordinates of each cell are defined as (N, 0), (0, N), and (N, N) for the upper right cell, lower left cell, and lower right cell, respectively, with the upper left cell defined as the origin (0, 0). In this case, the reference "N" is the number of cells on one side of a two-dimensional code, which number is 24 for example. The position coordinates of each cell are serially numbered in the order of the upper left cell, upper right cell, lower left cell, and lower right cell. The pattern data is the data that maps the black/white value of each of the cells indicated by the serial number to the black/white values of the cells indicated by the serial number. For example, "white" indicates "1" and "black" indicates "0".

If error correction processing is performed in step S58 of the known normal reading process in FIG. 4, the black/white values in the pattern data may be the values restored by the error correction process.

The training data 242 in the present embodiment includes both the code image data indicating the code image cut out in step S50 which is part of the known normal reading process shown in FIG. 4 and the foraging pattern data. The learning device 200 executes the learning process to adjust the model parameters 254 with reference to the training data 242 (refer to step S64 in FIG. 5). The training data 242 may include code image data indicating the code image clipped at step S80 in the learning reading process shown in FIG. 13, which is described later in the present embodiment, and the pattern data generated based on the learning reading process in FIG. 13. In this case, the pattern data may be generated based on the position coordinates of each cell identified in step S84 of FIG. 13 and the black/white value of each cell estimated in step S300 in FIG. 13.

Figure 13:
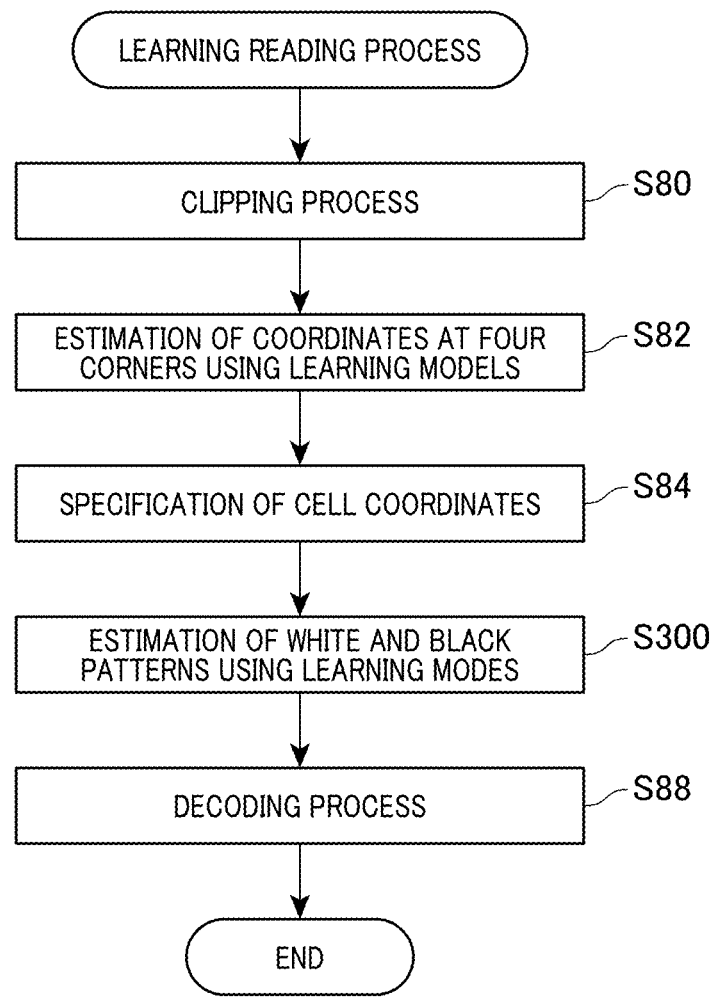
FIG. 13 is a flowchart showing a learning reading process performed in the fifth embodiment.

(Learning Reading Process: FIG. 13)

The learning reading process according to the present embodiment is identical to the process shown in FIG. 6 of the first embodiment, except that the process in step S300 is executed instead of the binarization process explained in step S86.

In step S300, the CPU 232 inputs the code image data indicating the code image clipped in step S80 into the learning model 52 realized in the memory 34, and obtains, from the learning model 52, estimated value of the black-and-white pattern of the two-dimensional code indicated by the code image. In step S88 following step S300, the CPU 32 decides (i.e., calculates) the black/white value of each cell of the two-dimensional code by referring to both the position coordinates of each cell identified in step S84 and the estimated value of the black-and-white pattern obtained in step S300. Then, the CPU 32 executes the code processing based on the black/while value of each cell that has already been decided.

In this way, in the learning reading process according to the present embodiment, instead of the binarization process explained by step S86 in the normal reading process, the black/while value of each cell of a two-dimensional code is determined by referring to the learning model 52 (step S30 in FIG. 13). For example, it is assumed that reading by the normal reading process fails due to the fact that the majority of the black/white of the two-dimensional code is discolored due to aging of the two-dimensional code. In the present embodiment, even if the black/while value of each cell determined by the binarization process of a two-dimensional code is significantly different from that before degradation due to the aging of the two-dimensional code, the information in that code can be read by executing the learning reading process. Thus, the information in the code can be read by executing the learning reading process.

A comparative example in which the pattern data is a plurality of pixels indicating a two-dimensional code is also assumed. In this comparative example, the amount of information in the pattern data increases as the number of pixels increases. In contrast, according to the structure of the present embodiment, a single value is associated with a single cell, so if the number of cells of a two-dimensional code is constant, the amount of information in the pattern data does not increase even if the number of pixels increases. Compared to the comparative example above, the configuration for the present embodiment can suppress an increase in the information volume of the pattern data. As a modification, the configuration of the above comparative example may be adopted.

In the present embodiment, the black/white patterns of cells in a two-dimensional code includes the black/while value of each of all the cells. For example, the two-dimensional code includes a group of cells lined up in a specific pattern, such as symbol marks (i.e., finder patterns), alignment patterns, timing patterns, etc. Hence, there can be provided a modification, the black/white patterns of cells in the two-dimensional code includes the black/while values of a plurality of cells from all cells, excluding the group of cells aligned in the above specific pattern, and may not include the black/while values of the groups of cells aligned in the above specific pattern.

In the present embodiment, as shown in FIG. 12, when the two-dimensional code is a code with the size of "24, 24" cells, the serial numbers in the black-and-white pattern for the respective cells are numbered from 1 to 624. The number 624 is the same value as the number of cells in the two-dimensional code. In a modification, the serial numbers in the black-and-white pattern for the respective cells may be numbered from 1 to M, where M is a value greater than 624. M may be the number of cells in the largest size of the two-dimensional code, for example, (177, 177)=31329. In this case, of the serial numbers from 1 to 31329, 624 serial numbers may be used and the remaining serial numbers may not be used. For example, all of the values corresponding to the remaining serial numbers may be set to "0". In this modification, in a situation where there are multiple sizes of two-dimensional codes, the single learning model 252 can be shared in learning the two-dimensional codes of such multiple sizes.

(Correspondence Relationship)

The pattern data is an example of "first relationship information. The estimated value of the pattern data is an example of "relationship information (and second relationship information).

Sixth Embodiment

The present embodiment is identical to the first embodiment, except that some of the processing executed by the learning device 200 is different from that executed in the first embodiment.

Figure 14:
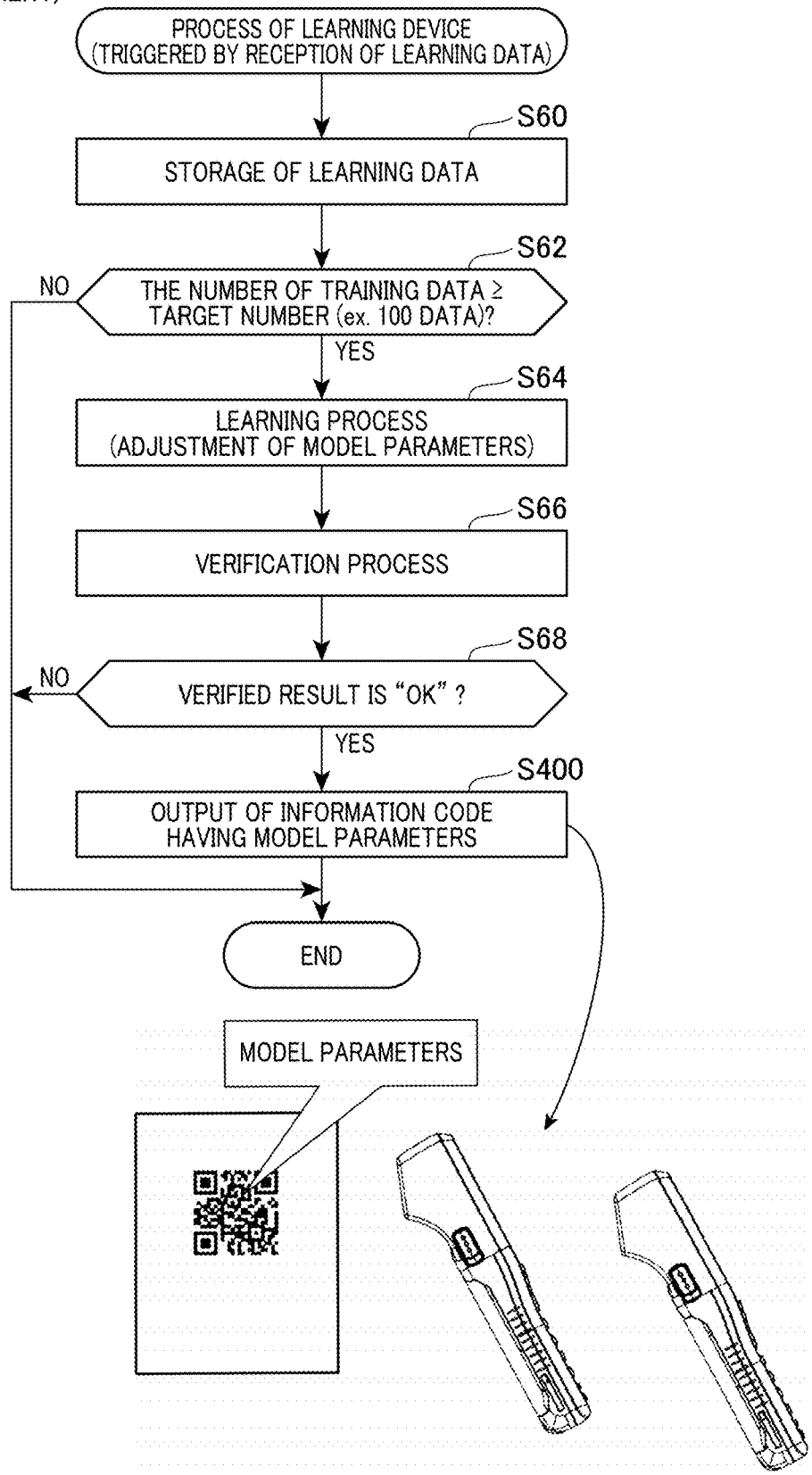
FIG. 14 a flowchart explaining a process executed by a learning device according to a sixth embodiment.

(Process of Learning Device 200: FIG. 14)

The processing of the learning device 200 in the present embodiment is identical to that of FIG. 5 explained in the first embodiment, except that the process of step S400 is performed instead of the process of step S70 in FIG. 5. In the present embodiment, all of the model parameters 254 of the learning model 252 may be adjusted or some of the model parameters 254 may be adjusted in the learning process of step S64. When a part of the model parameters 254 is adjusted, for example, the parameters on the side of the input layer of the multilayer neural network may be fixed to predetermined values, and the parameters on the side of the output layer of the multilayer neural network may be adjusted in the learning process.

If the CPU 232 determines that the verification result indicates "OK" (YES in step S68), the CPU 232 proceeds to step S400. At step S400, the CPU 232 generates a two-dimensional code that records the model parameters 254 adjusted in step S64. The CPU 232 then sends print data indicating the generated two-dimensional code to the printer 500. This causes the two-dimensional code to be printed.

The code reader 10 reads the printed two-dimensional code. Thereby, the code reader 10 obtains model parameters 254 in the two-dimensional code and stores the read model parameters 254 in the memory 34.

According to this configuration, the code reader 10 can obtain the model parameters 254 by reading the two-dimensional code. For example, it is assumed a situation where there is the first code reader that is the source of training data 242 and the second code reader 10 that is not the source of the data, and the second code reader 10 is not connected to LAN 4. Even in such a case, the second code reader 10 can obtain the model parameters 254 by reading the printed two-dimensional code without having to perform communication with the learning device 200.

The information recorded in the two-dimensional code is not limited to the plain text of the model parameters 254, but may be applied to, for example, reduced data of the plain text model parameters 254. The CPU 232 may also divide the model parameters 254 into a plurality of data, and for each of the divided plurality of data, the CPU 232 generate a two-dimensional code recording the data therein. According to such a configuration, a two-dimensional code recording the model parameters 254 can be created even when the amount of information in the model parameters 254 exceeds the amount of information that can be stored in a single two-dimensional code.

The information recorded in the two-dimensional code is not limited to all of the model parameters 254, but may be a portion of the model parameters 254. For example, if values of some of the model parameters 254 are fixed, only some of the parameters adjusted in the learning process of step S64 may be recorded in the two-dimensional code. For example, in the case where all of the model parameters 254 are adjusted, only parameters of the adjusted model parameters 254 that have been changed from the model parameters 254 provided before adjustment may be recorded in the two-dimensional code. The model parameters 254 provided before adjustment may be, for example, the model parameters 254 at the shipping stage or the adjusted model parameters 254 in the previous learning process. Compared to a configuration in which all of the model parameters 254 are recorded, the amount of information recorded in the two-dimensional code can be reduced.

(Correspondence Relationship)

In the current disclosure, the printer is an example of an "output device". In the modification, the learning device 200 may display the two-dimensional code in which the model parameters 254 are recorded on a display (not shown) that can communicate with the learning device 200. in this modification, said display is an example of an "output device".

Seventh Embodiment

In the present embodiment, the code reader 10 stores multiple pieces of learning information 50 in the memory 34. For example, the code reader 10 is used in various situations. For example, a situation in which the code reader 10 is used in the open air as well as in a factory is envisioned. Also, for example, it is assumed a situation in which the code reader 10 reads not only a two-dimensional code displayed on a first medium (e.g., paper medium), but also a two-dimensional code displayed on a second medium (e.g., metal) which is different from the first medium.

According to the configuration of the present embodiment, two specific learning information 50 can be stored for each of the various situations. This allows the various situations to be addressed.

The memory 34 is divided into several memory areas, including memory areas a1, b1, and b2. The program 40 is stored in the memory area a1, the first learning information 50 is stored in the memory area b1, and the second learning information 50 is stored the in the memory area b2. For example, it is assumed that a comparative example in which multiple pieces of learning information 50 are stored in a single memory area. In this comparison example, it is necessary to search for the learning information 50 to be updated from among the multiple pieces of learning information 50. In contrast, according to the configuration of the present embodiment, each of the multiple pieces of learning information 50 is stored in a different memory area from other memory areas. Therefore, it is not necessary to search for learning information 50 to be updated, from among the multiple pieces of learning information 50, but only to access the memory area where the targeted learning information 50 to be updated are stored.

(Correspondence Relationship)

The memory 34 is an example of "specific memory". The memory area a1 is an example of "first area. The memory areas b1 and b2 are examples of "second area.

Figure 15:
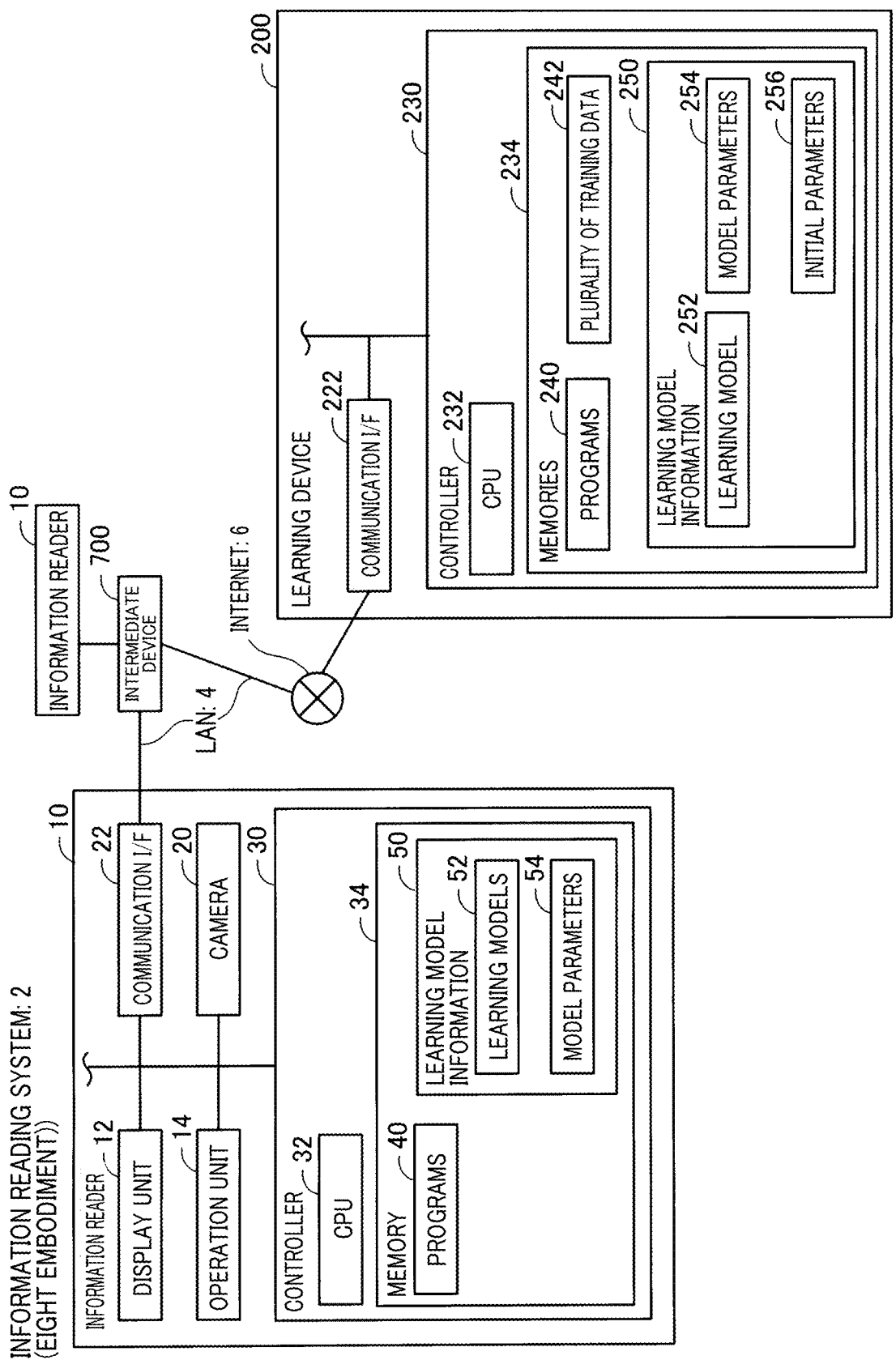
FIG. 15 is a block diagram showing an information reading system according to a seventh embodiment.

Eighth Embodiment (Information Reading System 2: FIG. 15)

The present embodiment is identical to the first embodiment, except that the information reading system 2 is equipped with an intermediate device 700 and the learning device 200 is built on the Internet 6.

The intermediate device 700 is, for example, a server. The intermediate device 700 is communicably connected to LAN 4. The intermediate device 700 can thus communicate with the code reader 10 via LAN 4. The intermediate device 700 is communicably connected to the Internet 6. As a result, the intermediate device 700 can communicate with the learning device 200 via the Internet 6.

The code reader 10 can communicate directly with the intermediate device 700, but not directly with the learning device 200. For example, the code reader 10 sends the training data 242 to the intermediate device 700. The intermediate device 700 then sends the received training data 242 to the learning device 200. Also, for example, the learning device 200 sends the adjusted model parameters 254 to the intermediate device 700. The intermediate device 700 then sends the adjusted model parameters 254 to the code reader 10. That is, the intermediate device 700 mediates communication between the code reader 10 and the learning device 200.

According to the configuration of the present embodiment, the intermediate device 700 can block the code reader 10 from the Internet 6. The code reader 10 can be inhibited from receiving access directly from the Internet 6. The intermediate device 700 exemplifies an "intermediate device".

Figure 19:
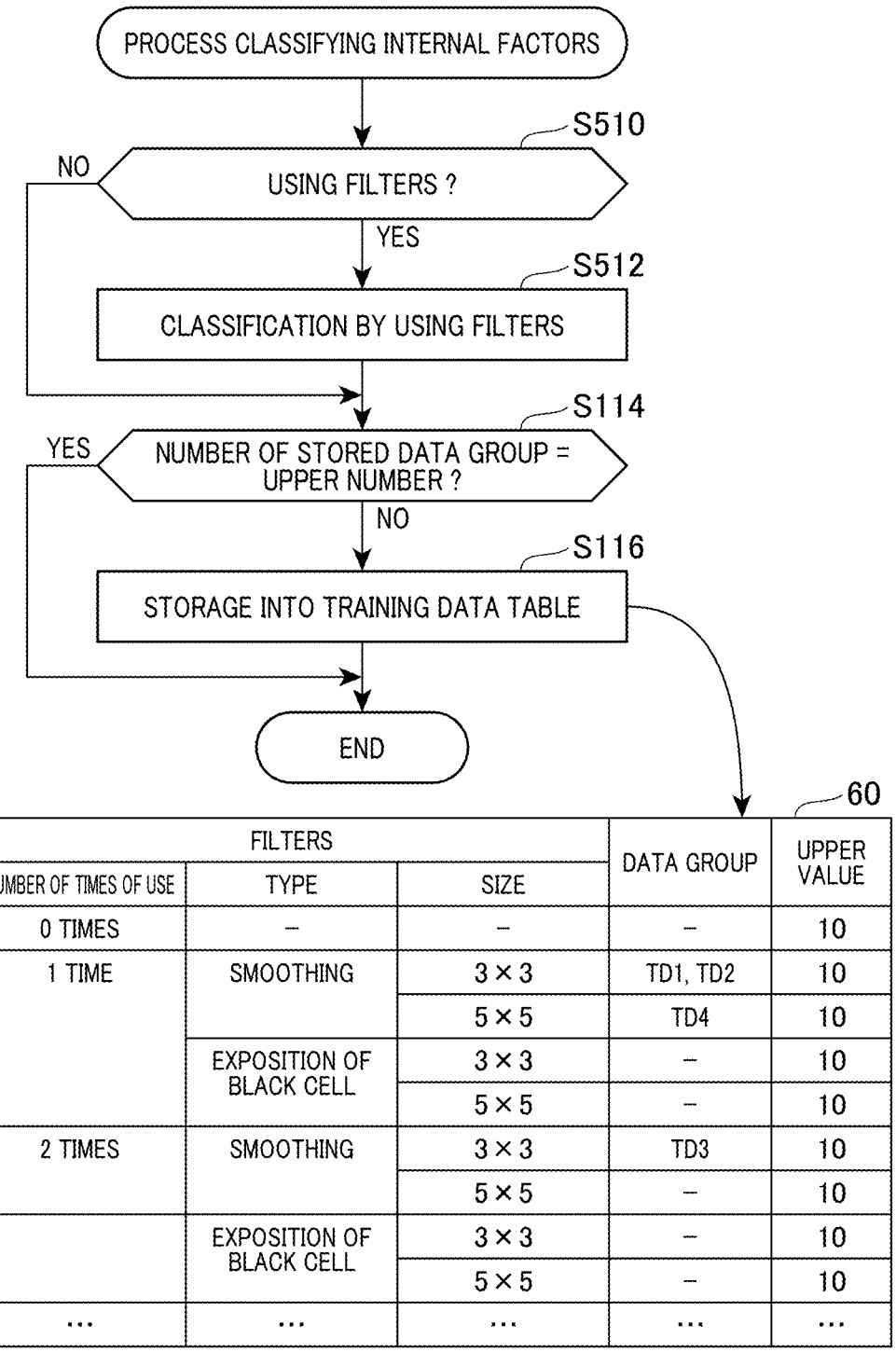
FIG. 19 is a flowchart explaining a process of classifying internal factors, which is performed in a ninth embodiment.

Ninth Embodiment (Process for Classifying Internal Factors: FIG. 19)

The present embodiment is similar to the second example, except that instead of the deterioration classifying process of step S100 in FIG. 7, an internal factor classifying process that classifies according to internal factors, which is an internal process of code reader 10 and settings of code reader 10, is executed.

The code reader 10 is able to perform image processing on code images, for example, to improve the accuracy of reading therefrom. The Image processing is for transforming a code image using at least one filter. The filter can be, for example, a smoothing filter, a black dilation filter, a black erosion filter, etc. The smoothing filter is a filter that smoothens the luminance values in a code image. The black dilation filter dilates black blobs in a code image. The black erosion filter is a filter that erodes the black blobs in a code image. These image processes are used, for example, for two-dimensional code images with unclear printing. The above examples of filters are only one example, and the code reader 10 can also use filters other than the above examples.

The internal factor classification process according to the present embodiment is a process to classify two-dimensional codes to be read according to the internal factors, which indicate how to use of the filters in the code reader 10. As modifications, the use of the filters may be set by the user or automatically selected by the code reader 10. The filters may be used more than once, and the sizes of the filters may vary.

The processing in FIG. 19 is identical to that shown in FIG. 8, except that steps S510 and S512 are executed instead of steps S110 and S112 in FIG. 8. In step S510, the CPU 32 determines whether at least one filter has been used for a code image. When the CPU 32 determines that no filter was used for the code image (NO in step S510), the CPU 32 skips the process of step S512, described below, and proceeds to step S114.

In step S512, the CPU 32 classifies the code image based on the filter usage. As shown in the training data table 60 in FIG. 19, the items of classification include, for example, the number of times the filter has been used, the type of filter, and the size of the filter. For example, as shown in FIG. 19, if the smoothing filter of size "3×3" is used only once for a code image, the SUCCESSFUL CASES corresponding to that code image is training data TD1 corresponding to the items "size "3×3", smoothing filter, and once". Such successful cases are stored as the training data TD1 in the training tata table 60 (step S116). If no filters are used for a code image (NO in at S510), the successful cases corresponding to that code image are stored in the training data table 60 as training data, corresponding to the item "0 times" for the number of use times (step S116). The items shown in FIG. 19 are only an example. For example, if two types of filters are used, a combination of items of the two filters may also be employed.

The present embodiment can provide the same effect as that explained in the second embodiment. That is, compared to the configuration in which successful cases are unconditionally adopted as training data 242, the variations in successful cases can be suppressed to be biased toward cases in which a specific filter is used (e.g., the use of a smoothing filter).

Figure 20:
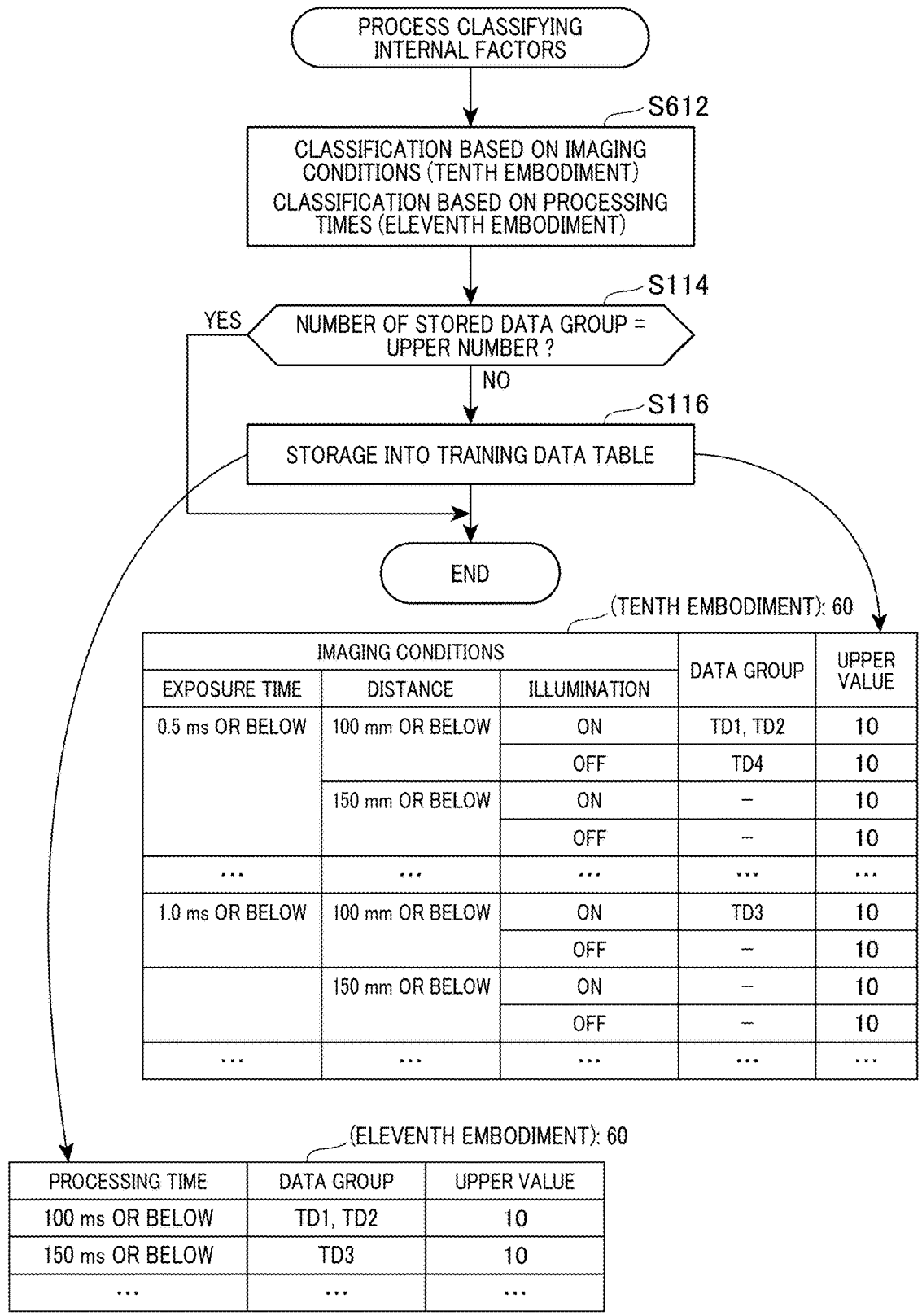
FIG. 20 is a flowchart explaining a process of classifying internal factors, which is performed in tenth and eleventh embodiments.

Tenth Embodiment (Process for Classifying Internal Factors: FIG. 20)

The internal factor classification process according to the present embodiment is a process to classify two-dimensional codes to be read, according to internal factors which are the imaging conditions of the code reader 10. The imaging conditions include an exposure time, a distance to a image target, an ON/OFF states of illumination (e.g., flash). The imaging conditions may be set by the user or selected automatically by the code reader 10. The distance to the imaging target may be calculated based on a focal length, for example, or it may be calculated by a stereo method with reference to an indication marker illuminated on the reading target.

The process in FIG. 20 is identical to the process explained in FIG. 8, except that step S612 is executed instead of steps S110 and S112 in FIG. 8. In step S612, the CPU 32 classifies the code images based on the imaging conditions currently used for capturing the code images. As shown in the training data table 60 in FIG. 20, the classification items are, for example, an exposure time, a distance, an illumination, etc. For example, as shown in FIG. 20, if the exposure time is 0.5 ms or less, the distance to an imaging target is 100 mm or less, and the illumination is turned ON, the successful cases corresponding to this code image provide the training data TD1 showing the items "0.5 ms or less, 100 mm or less, and ON". The thus classified training data TD1 are stored in the training data table 60 (S116). The items shown in FIG. are only an example, and other imaging conditions may be employed.

The same effect obtained in the second embodiment can also be obtained with the present embodiment. That is, compared to the configuration in which successful cases are unconditionally adopted as the training data 242, the variation in successful cases can be suppressed from being biased toward cases provided under specific imaging conditions.

Eleventh Embodiment (Process for Classifying Internal Factors: FIG. 20)

The internal factor classification process performed in the present embodiment is a process to classify two-dimensional codes to be read according to internal factors, which are derived from the processing time of the reading process of the code reader 10. The processing time is, for example, a time duration from the start to the end of the normal reading process (refer to FIG. 4) or the time duration from the start to the end of the learning reading process (refer to FIG. 6). In other modifications, the processing time may be a part of the normal reading process, for example, the time duration from the start to the end of the decoding process.

In step S612 of the present embodiment, the CPU 32 is responsible for classifying the code images based on the processing time (time duration). As shown in the training data table 60 in FIG. 20, the classification items are, for example, a processing time "less than 100 ms", a processing time "less than 150 ms", etc. For example, if the processing time is greater than 100 ms and less than or equal to 150 ms, the successful cases corresponding to a code image now being targeted is stored in the training data table 60 as training data TD3 corresponding to the item "150 ms or less" (S116). The training data TD3 is stored in the training data table 60. The items shown in FIG. 20 are listed just as an example.

Longer processing times are caused, for example, by deterioration of two-dimensional codes. Hence, the length of the processing time and the degree of code deterioration can be correlated with each other. Classification based on the processing time can prevent the variations of successful cases from being biased toward cases with a particular degree of deterioration (degradation). The same effect as that provided in the second embodiment can be obtained with the present embodiment.

Twelfth Embodiment (Process Executed by Code Reader 10: FIG. 20)

The present embodiment is identical to the second embodiment, except that a determination process executed in step S700 is added. When the CPU 32 determines that the number of training data 242 is less than the target number (NO in step S102), the CPU 32 proceeds to step S700. In step S700, the CPU 32 determines whether the total number of data groups of one or more items with high impact among the plurality of items in the training data table 60 is greater than a predetermined number. The foregoing predetermined number is smaller than the target number in step S102. The degree of influence is set according to the high likelihood that reading a two-dimensional code will fail. The items with a higher degree of influence includes, for example, the pattern number that indicates the deterioration of symbol marks in the pattern determination process (FIG. 9). In a two-dimensional code, the area in which data is recorded can be restored, to a certain degree, by an error correction process even if the area deteriorates. In contrast, the symbol marks cannot be restored by the error correction process. If the symbol marks deteriorate, the location of a two-dimensional code itself cannot be identified and reading of two-dimensional code is likely to fail. In the present embodiment, items that indicate deterioration of symbol marks, which are more likely to cause failure in reading two-dimensional codes, are adopted as items with higher impact than other items.

When the CPU 32 determines that the total number of data groups of one or more items with high impact is greater than or equal to the predetermined number (YES in step S700), the CPU 32 proceeds to step S104. On the other hand, when the CPU 32 determines that the total number of data groups of one or more items with high impact is less than the predetermined number (NO in step S700), the CPU 32 skips step S104 and proceeds to step S44.

According to the configuration of the present embodiment, even if the number of training data 242 does not reach the target number (NO in step S102), if the code reader 10 determines that the total number of data groups of one or more items with high impact is more than five predetermined numbers (YES in step S700), the code reader 10 sends all of the training data 242 to the learning device 200 (step S104). The successful cases corresponding to data groups of one or more items with high impact indicate that, although the two-dimensional code can be read successfully, there is an increased likelihood that the two-dimensional code reading will fail due to deterioration of the symbol mark, etc. In the situation where the likelihood of reading the two-dimensional code will end is increasing, the learning can be started quickly without waiting for the number of training data 242 to reach the target number.

Figure 21:
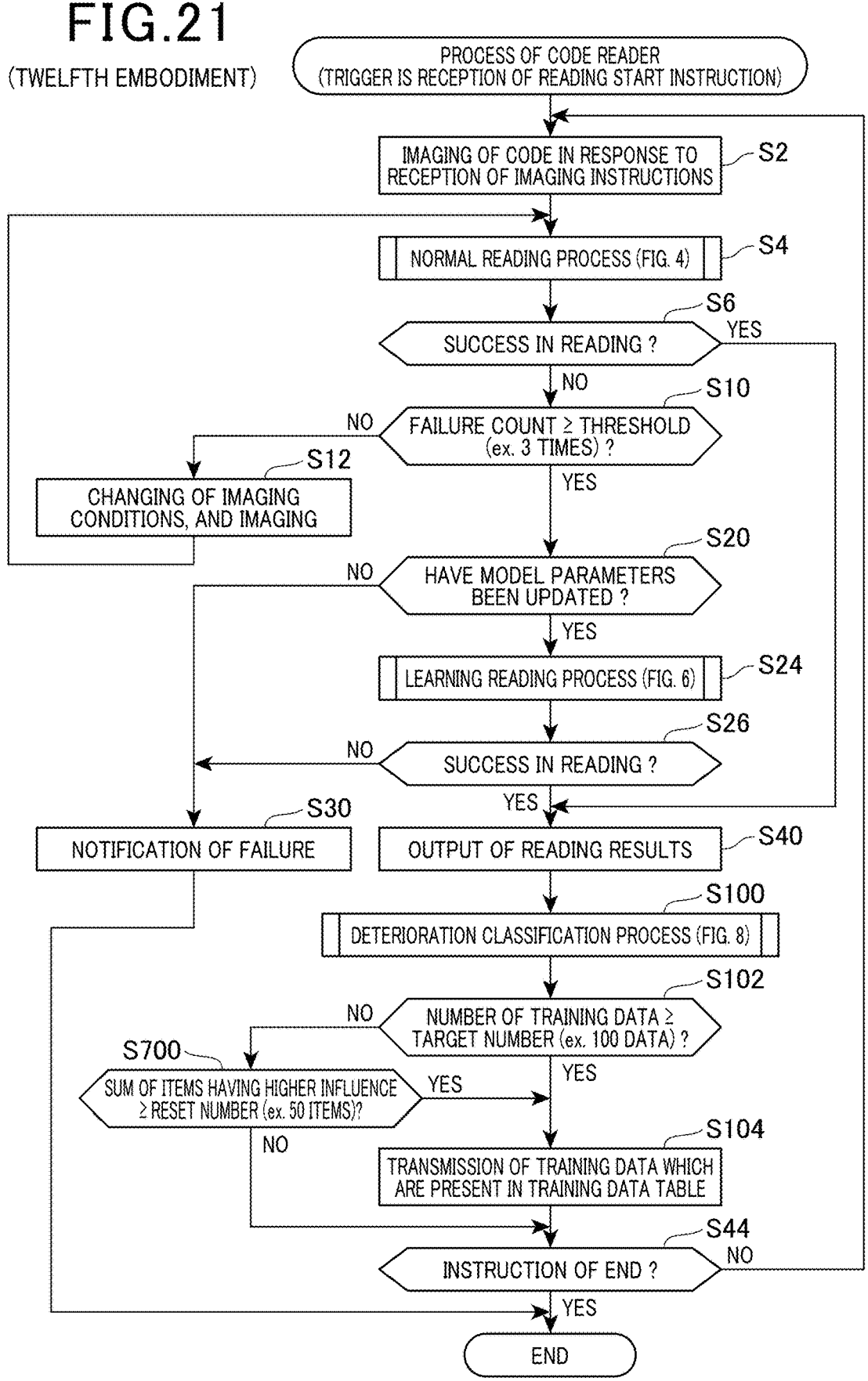
FIG. 21 is a flowchart showing a process executed by a code reader in a twelfth embodiment.

The determination of step S700 in FIG. 21 may be adopted by the classification based on deterioration of information codes, as well as the classification based on contrast of information codes (a modification of the second embodiment), classification based on deformation of information codes (other modifications of the second embodiment (FIGS. 16 to 18)), and classification based on the internal factors of the code reader (the 9th to 11th embodiments (FIG. 19, FIG. 20)). The determination at step S700 in FIG. 21 may also be employed for classification based on a combination of the internal factors of at least two of the foregoing degradation, contrast, and deformation.

Figure 22:
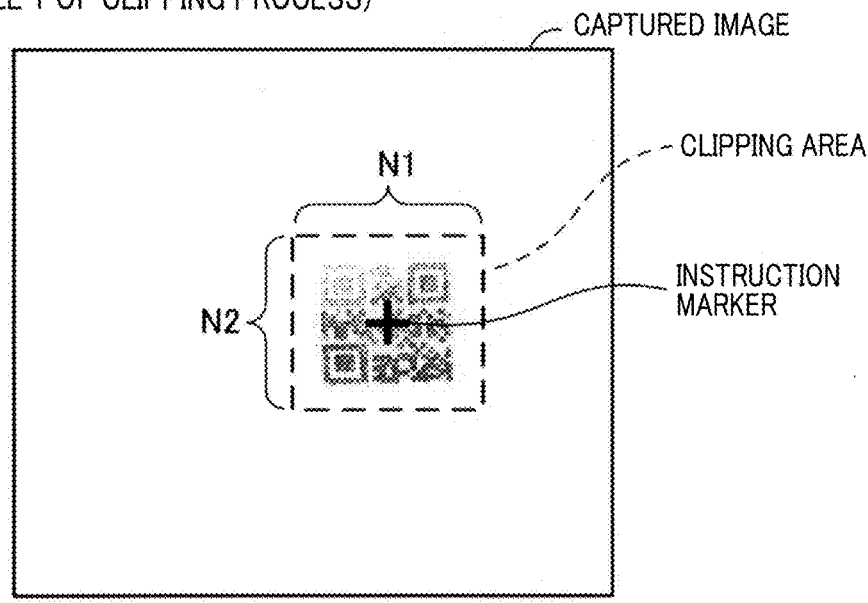
FIG. 22 is an illustration explaining a practical example 1 of a clipping process.

Practical Example 1 of Clipping Process: FIG. 22

A practical example 1 of the cutting process executed in step S50 of FIG. 4 and step S80 of FIG. 6 and FIG. 13 is described below. The code reader 10 is capable of irradiating an indicating marker that indicates a two-dimensional code to be read. The indication marker has a predetermined shape such as a cross, circle, square, etc. In the practical example 1, the CPU 32 identifies a position for the indication marker in the image captured by the camera 20. For example, the CPU 32 extracts a predetermined shape for the indication marker in the captured image and identifies the position of the predetermined shape as the position of the indication marker. In a modification, the CPU 32 may identify the center of the image capture image as the position of the indication marker when the light source of the indication marker is located on the center line of the angle of view of the camera 20.

The CPU 32 then sets a clipping range with the position of the indication marker as the center, using the predetermined number of pixels (width, height)=(N1, N2), and crips the captured image within the clipping range. The predetermined number of pixels (N1, N2) is set in advance based on, for example, the size of the two-dimensional code to be read. The numbers N1 and N2 are positive integers, and the number N2 may be the same as or different from the number N1.

According to this configuration, a code image including a two-dimensional code can be easily clipped or cut out from the captured image, based on the indication marker.

Practical Example 2 of Clipping Process: FIG. 2

Figure 23:
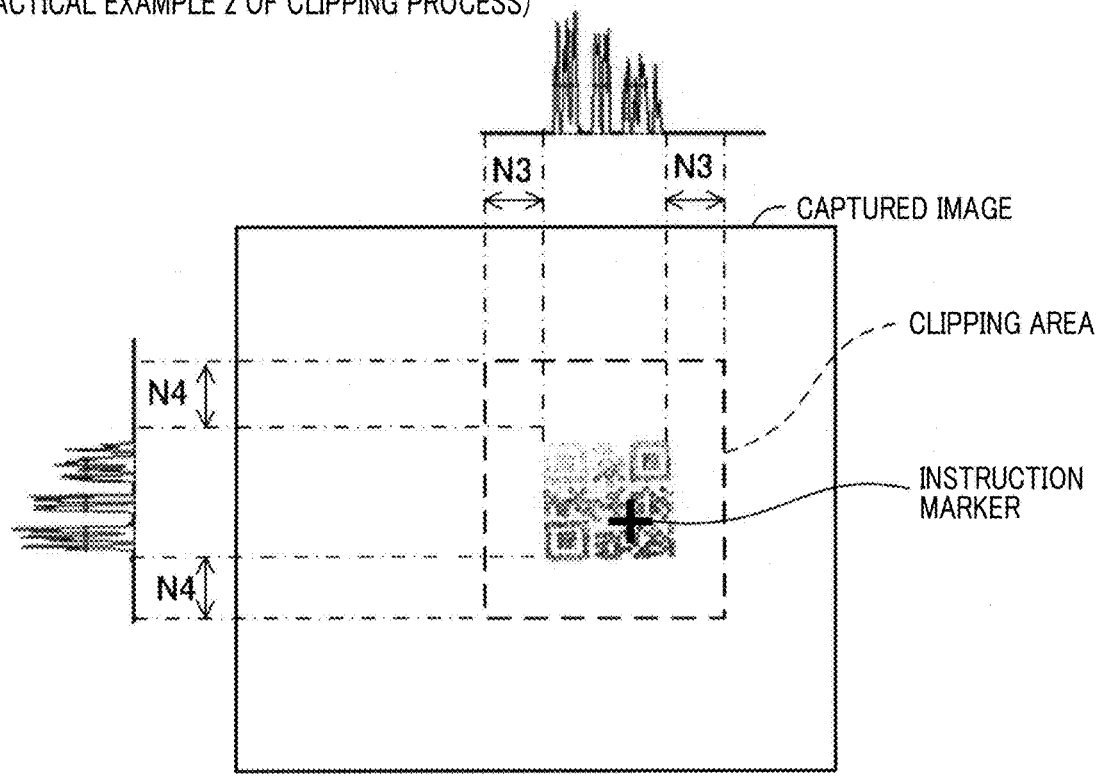
FIG. 23 is an illustration explaining a practical example 2 of a clipping process.

Another practical example 2 of the clipping process is described below. A two-dimensional code has black-and-white cell patterns. Hence, as shown in FIG. 23, the luminance values of the pixels indicating the two-dimensional code fluctuates greatly, while the luminance values of the pixels indicating the background other than the two-dimensional code hardly fluctuates. In this practical example, the CPU 32 analyzes the luminance values of the pixels along the horizontal direction from the position of the indication marker, and estimates pixels whose luminance fluctuations are more than a predetermined value as boundary lines of the two-dimensional code in the horizontal direction.

Similarly, the CPU 32 performs the same analysis in the vertical direction from the position of the indication marker, and estimates pixels whose luminance variations are greater than a predetermined value as boundary lines of the two-dimensional code in the vertical direction. Then, the CPU 32 decides lines which are separated by a predetermined number of pixels N3 from in the boundary lines in the horizontal direction as the vertical lines for the clipping range, and decides lines which are separated by a predetermined number of pixels N4 from the boundary lines in the vertical direction as the horizontal lines for the clipping range.

The predetermined number of pixels N3 and N4 are set in advance based on, for example, the size of a two-dimensional code to be read. The numbers N3 and N4 are positive integers, and the number N3 may be the same as or different from the number N4. The clipping range is set wider than the boundary lines estimated by the above analysis, based on the predetermined numbers of pixels N3 and N4. This allows the two-dimensional code to be included in the clipping range even if the contour cells of the two-dimensional code become thinner or discolored due to aging of the two-dimensional code to be read.

Figure 24:
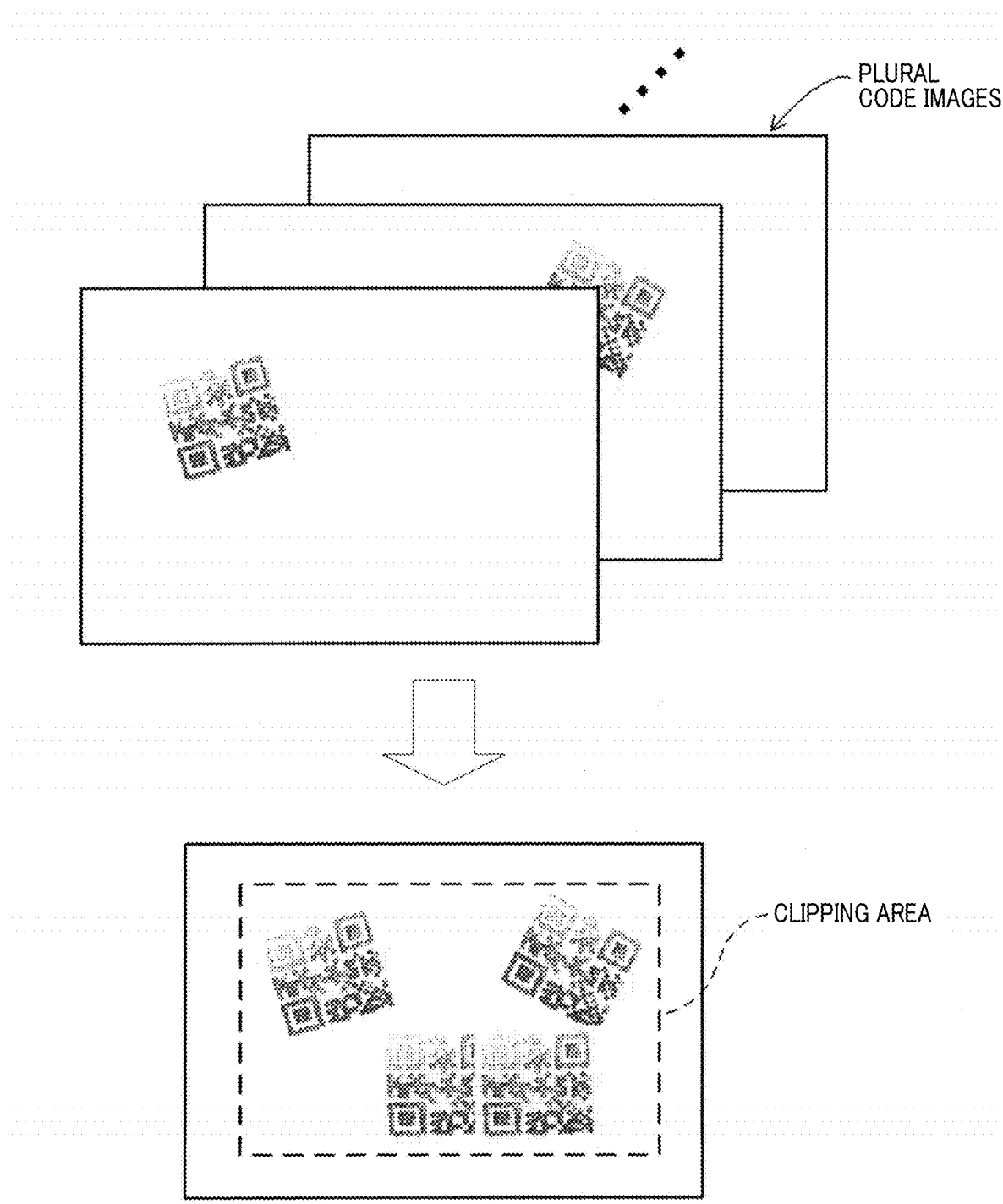
FIG. 24 is an illustration explaining a practical example 1 of a clipping process.

Practical Example 3 of Clipping Process: FIG. 24

Another practical example 3 of the clipping process will now be described.

In this specific example, CPU 32 calculates the position coordinates at the four corners of each of the code images provided by, at least, one of the code image data in the plurality of training data 242 stored in S60 in FIG. 5, in the same manner as step S52 in FIG. 4. The CPU 32 then sets a clipping range to a range including all of such calculated four corners.

According to this configuration, a clipping range can be set even for a code reader 10 that does not use the indication marker. Such a code reader 10 is, for example, a fixed code reader fixed to a factory production line, a POS cash register, etc.

The foregoing description of the practical examples according to the technology disclosed herein are examples only and do not limit the scope of the claims. The technology described in the claims includes various deformation and modification of the practical examples provided above. For example, the following modifications may be employed.

Modification 1

The "information code" is not limited to a two-dimensional code, but may be, for example, a bar code, a multi-level bar code, etc.

Modification 2-1

The learning target of the learning device 200 is not limited to the position coordinates of the four corners of a two-dimensional code (refer to the first embodiment) or the black and white pattern of each cell of a two-dimensional code (refer to the fifth embodiment). For example, the learning target may be code position information indicating the positions of a code image in the captured image. For example, a situation can be assumed in which the black portion of a two-dimensional code fades and becomes difficult to find the two-dimensional code in the captured image. By learning the code position information, the two-dimensional code can be found in the captured image even in the foregoing difficult situation, and the code image can be clipped in the clipping process shown in FIG. 4. In this modification, the code location information is an example of "relational information (first relationship information and second relationship information).

Modification 2-2

Furthermore, the learning target may be an area to be clipped in the clipping process. Furthermore, the learning target may be the position coordinates of the four corners of each of the three symbol marks composed of cells and located at the three corners of a two-dimensional code. Furthermore, the learning target may be the position of the timing pattern of a two-dimensional code. Generally speaking, the learning target may be information (position, size, etc.) indicating a given pattern (e.g., symbol marks, timing pattern, etc.) in a two-dimensional code. In these modifications, the foregoing information showing the clipped area, the position coordinates of the four corners of each of the symbol marks, or the specific pattern in the two-dimensional code exemplify "relational information (first relationship information and second relationship information)".

Modification 2-3

The foregoing "relational information (first relationship information and second relationship information)" is not limited to one type of information (e.g., the position coordinates of the four corners of a two-dimensional code), but can be multiple types of information (e.g., the position coordinates of the four corners of each of the symbol marks and the four corners of the two-dimensional code).

Modification 3

In each of the foregoing embodiments, the training data 242 can include successful cases in the learning reading process as well as successful cases in the normal reading process (i.e., the normally used known reading process). In a modification, the training data 242 may include successful cases in the normal reading process and may not include successful cases in the learning reading process. Generally speaking, the "training data" should include at least a plurality of successful cases of the reading process using the first relationship information.

Modification 4

The foregoing "classification unit" and "determination unit" are not limited to the units realized by the controller 30 of the code reader 10, but may be, for example, those units functionally realized by the controller 230 of the learning device 200. In such a modified case, the process in FIG. 8 may be executed by the controller 230 of the learning device 200.

Modification 5

In the second embodiment, the training data table 60 is not limited to be provided by the memory 34 of the code reader 10, but may be stored in the memory 234 of the learning device 200, for example. In such a modification, the memory 234 corresponds to "first memory".

The technical elements described in this specification or in the drawings demonstrate technical usefulness alone or in various combinations, and are not limited to the combinations described in the claims at the time of filing. In addition, the technology illustrated in this specification or the drawings achieves multiple purposes simultaneously, and achieving one of the purposes has technical utility by itself.

DESCRIPTION OF PARTIAL REFERENCE SIGNS

- 2: information reading system
- 4: LAN
- 6: internet
- 10: code reader code reader
- 12: operation unit
- 14: display unit
- 20: camera
- 22: communication I/F
- 30: controller
- 32: CPU
- 34: memory
- 40: program
- 50: learning information
- 52: learning model
- 54: model parameter
- 60: training data table
- 200: learning device
- 222: communication I/F
- 230: controller
- 232: CPU 234: memory
240: program
242: training data
250: learning information
252: learning model
254: model parameter
256: initial parameter
270: case example table
500: printer
700: intermediate device
L1 to L14: coordinates (positional coordinates)
a1, b1, b2: memory area

The invention claimed is:

1. An information reader, comprising:
a camera imaging a two-dimensional information code;
a first code process execution unit configured to perform a first code process, the first code process includes
a detection process detecting a first relationship information defining a two-dimensional code area of the first information code from an image of a first information code which serves as the information code imaged by the camera;
a reading process reading information recorded in the first information code based on the first relationship information which has been detected;
an adjustment unit configured to adjust learning model parameters based on training data including, at least, a plurality of successful cases of the reading process read based on the first relationship information, the learning model parameters being for outputting second relationship information shown by estimated values of information defining a two-dimensional code area of the information code from the information code imaged by the camera; and
a second code process execution unit configured to execute a second code process, the second code process includes
an acquisition process acquiring inputting, into the learning model, an image of the second information code, which serves as the information code imaged by the camera, and acquire the second relationship information from the learning model;
a reading process reading information recorded in the second information code based on the second relationship information which has been acquired; and
an output process outputting a reading result of the reading process;
one or more code readers each having the camera, the first code process execution unit and the second code process execution unit; and
a learning device provided with the adjustment unit, the learning device being separate from the one or more code readers, wherein
the one or more code readers are configured to acquire the parameters from the learning device, and
the second code process execution unit is configured to execute the second code process based on the acquired and adjusted parameters.

2. The information reader according to claim 1, wherein the first relationship information is information indicating positional coordinates at four corner points of the information code.

3. The information reader according to claim 1, wherein the first relationship information is information indicating a black and white pattern of a plurality of cells composing the two-dimensional code area of the information code.

4. The information reader according to claim 3, wherein the first relationship information includes a correspondence between information indicating a position of each of the cells and a value indicting that each of the cells is either white or black.

5. The information reader according to claim 1, wherein the learning device is built on an Internet, and
the information reader further comprises an intermediate device connected to the Internet and configured to intermediate communication between the one or more code readers and the learning device.

6. The information reader according to claim 1, comprising an output device configured to output a specific information code in which the adjusted parameters are recorded,
wherein each of the one or more code readers is configured to read the adjusted parameters from the specific information code outputted by the output device, thereby obtaining from the learning device all or part of the adjusted parameters.

7. The information reader according to claim 1, wherein the one or more code readers include a first code reader and a second code reader which is different from the first code reader,
the learning device is configured to acquire the training data from the first code reader and adjust the parameters based on the acquired training data, and
the second code reader is configured to
acquire from the learning device the parameters which have been adjusted based on the training data in the first code reader, and
execute the second code process based on the acquired parameters.

8. The information reader according to claim 1, comprising a specific memory, wherein
the specific memory includes a first area and a second area which is different from the first area, the first area stores therein programs for executing the first and second code processes,
the second area is for storing therein a plurality of pieces of learning information, and
each of the plurality of pieces of learning information includes the learning model and the adjusted parameters.

9. The information reader according to claim 1, comprising a specific memory, wherein
the adjustment unit is configured to start adjusting the parameters of the learning model after the plurality of successful cases contained in the training data exceeds in number a predetermined number.

10. The information reader according to claim 9, comprising
a classification unit configured to classify a target information code which is successfully read in the reading process of the first code process, into a specific pattern of a plurality of patterns relating to types of deterioration of the information code, and
a determination unit configured to determine whether to adopt a successful case of the target information code as the training data, based on the specific pattern.

11. The information reader according to claim 10, wherein the classification unit is configured to
specify a deteriorated location of the target information by comparing an image of a restored code restored by an error correction applied to the target information code in the reading process, with a binarized image obtained from an actual image of the target information code, and classify the target information code into the specific pattern, based on the deteriorated location obtained by the comparison.

12. The information reader according to claim 10, wherein
the classification unit is configured to classify the target information code into the specific pattern, based on at least one of a contrast of an image of the target information code and deformation of the target information code.

13. The information reader according to claim 10, further comprising:
a classification unit configured to classify a target information code successfully read by the reading process of the first code process, into a specific item among a plurality of items presenting internal factors of the information reader, and
a determination unit configured to determine whether to adopt a successfully read case of the target information code as the training data, based on the specific item,
wherein the plurality of items include at least one of:
two or more items related to image processing performed on the image of the information code by the information reader,
two or more items relating to imaging conditions under which the information reader captures the information code, and
two or more items relating to a processing time for the information reader to read information recorded in the information code.

14. The information reader according to claim 13, further comprising:
a first memory; and
a first storage control unit configured to store the successful cases of the target information code in the first memory as the training data when it is determined that the successful cases of the target information code is adopted as the training data based on the specific pattern, and not to store the successful cases of the target information code in the specific memory when it is determined that the successful cases of the target information code is not adopted as the training data based on the specific pattern,
wherein the adjustment unit is configured to adjust the parameters depending on the training data stored in the first memory.

15. The information reader according to claim 9, wherein
the adjustment unit is configured to start adjusting the parameters of the learning model when two or more successful cases among the plurality of successful cases exceeds, in number, specific number that is less than the predetermined number, even before the plurality of successful cases contained in the training data exceeds, in number, the predetermined number,
wherein each of the two or more successful cases is a case indicating an increased likelihood that the information code will fail to be read although the information code can currently be read successfully.

16. The information reader according to claim 1, further comprising an increase control unit configured to apply an image processing to a code image which is an image of the information code imaged by the camera, generate virtual cases of the reading process, and increase the number of successful cases in the training data.

17. The information reader according to claim 16, wherein
the image processing includes image processing types comprising at least one of a process for increasing a contrast of the code image, a process for adding a predetermined image to the code image, and a process for processing respective cells of the information code presented by the code image.

18. The information reader according to claim 17, further comprising a second memory storing therein, for each of a plurality of information codes, case information indicating examples of the reading process performed on the information codes,
wherein the increase control unit is configured to select one or more of the image processing types based on trends in the examples of the reading process indicated by the plurality of the case information stored in the second memory, and execute the one or more of the image processing types that have been selected.

19. The information reader according to claim 18, further comprising a second storage control unit configured to store, into the second memory, information indicating examples of the reading process performed on the first information code when the reading process using the first relationship information is performed.

* * * * *